(12) United States Patent
Chellappan et al.

(10) Patent No.: US 11,048,928 B1
(45) Date of Patent: Jun. 29, 2021

(54) SYSTEMS AND METHODS OF ENTOMOLOGY CLASSIFICATION BASED ON EXTRACTED ANATOMIES

(71) Applicant: University of South Florida, Tampa, FL (US)

(72) Inventors: Sriram Chellappan, Tampa, FL (US); Mona Minakshi, Tampa, FL (US); Jamshidbek Mirzakhalov, Tampa, FL (US); Sherzod Kariev, Tampa, FL (US); Willie McClinton, Winter Garden, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 17/081,471

(22) Filed: Oct. 27, 2020

Related U.S. Application Data

(60) Provisional application No. 62/970,026, filed on Feb. 4, 2020.

(51) Int. Cl.
*G06K 9/00* (2006.01)
*G06K 9/62* (2006.01)
(Continued)

(52) U.S. Cl.
CPC ....... *G06K 9/00362* (2013.01); *G06K 9/4604* (2013.01); *G06K 9/6202* (2013.01);
(Continued)

(58) Field of Classification Search
CPC ............. G06K 9/00362; G06K 9/4604; G06K 9/6202; G06K 9/6267; G06K 9/6257; G06N 3/08
See application file for complete search history.

(56) References Cited

U.S. PATENT DOCUMENTS 7,496,228 B2   2/2009  Landwehr et al.
8,606,011 B1  12/2013  Ivanchenko et al.
(Continued)

FOREIGN PATENT DOCUMENTS

CN    106599925   4/2017
CN    107463958  12/2017
(Continued)

OTHER PUBLICATIONS

Minakshi, M., Bharti, P., Bhuiyan, T. et al. A framework based on deep neural networks to extract anatomy of mosquitoes from images. Scientific Reports 10, 13059 (Aug. 3, 2020).*
(Continued)

*Primary Examiner* — Samir A Ahmed
(74) *Attorney, Agent, or Firm* — Meunier Carlin & Curfman LLC

(57) ABSTRACT

A method of identifying a living creature includes training a convolutional neural network model using pretrained convolutional neural networks to generate proposals about the regions where there might be an anatomical object within a digital image. Introducing a residual connection to get the input from the previous layer to the next layer helps in solving gradient vanishing problem. The next step is to design an object detector network that does three tasks: classifying the boxes with respective anatomies, tightening the boxes, and generating a mask (i.e., pixel-wise segmentation) of each anatomical component. In constructing the architecture of the object detector network, the network uses per-pixel sigmoid, and binary cross-entropy loss function (to identify the k anatomical components) and rigorously train them.

20 Claims, 13 Drawing Sheets
(6 of 13 Drawing Sheet(s) Filed in Color)

(51) Int. Cl.
   *G06K 9/46* (2006.01)
   *G06N 3/08* (2006.01)

(52) U.S. Cl.
   CPC ......... *G06K 9/6257* (2013.01); *G06K 9/6267* (2013.01); *G06N 3/08* (2013.01)

(56) References Cited

U.S. PATENT DOCUMENTS

| | | | |
|---|---|---|---|
| 2003/0026484 | A1 | 2/2003 | O'Neill |
| 2018/0092336 | A1* | 4/2018 | Erickson ............... A01K 49/00 |
| 2018/0322327 | A1* | 11/2018 | Smith .................... G06N 5/046 |
| 2018/0322660 | A1* | 11/2018 | Smith .................... G06K 9/6267 |
| 2019/0002087 | A1 | 1/2019 | Mills et al. |
| 2019/0034736 | A1 | 1/2019 | Bisberg et al. |
| 2020/0019765 | A1* | 1/2020 | Ampatzidis .......... G06N 3/0454 |
| 2020/0143202 | A1 | 5/2020 | Chellappan |
| 2020/0294248 | A1* | 9/2020 | Garrett ................. G06K 9/2018 |

FOREIGN PATENT DOCUMENTS

| | | |
|---|---|---|
| CN | 104850836 | 4/2018 |
| CN | 108304818 | 7/2018 |
| CN | 108334938 | 7/2018 |
| CN | 109949283 | 6/2019 |
| CN | 110674805 | 1/2020 |

OTHER PUBLICATIONS

De Los Reyes, Anna Monica M., et al. "Detection of Aedes Aegypti mosquito by digital image processing techniques and support vector machine." Nov. 22-25, 2016 IEEE Region 10 Conference (TENCON). IEEE, 2016. pp. 2342-2345. Singapore.

2018. CDC—Malaria—About Malaria—Biology—Mosquitoes—Anopheles Mosquitoes. https://www.cdc.gov/malaria/about/biology/mosquitoes/. (Accessed on Mar. 2, 2018).

2018. Explanation of the LAB Color Space. https://www.aces.edu/dept/fisheries/education/pondtoplate/documents/ExplanationoftheLABColorSpace.pdf: (Accessed on Feb. 24, 2018). (Abstract Only).

2018. Image Derivative • Chris McCormick. http://mccormickml.com/2013/02/26/image-derivative/. (Accessed on Mar. 1, 2018).

2018. Project Premonition—Microsoft Research. https://www.microsoft.com/en-us/research/project/project-premonition/. (Accessed on Feb. 23, 2018).

Ahmedelmubarak Bashir, Zeinab A Mustafa, Islah Abdelhameid, and Rimaz Ibrahem. Jan. 16-18, 2017. Detection of malaria parasites using digital image processing. In Communication, Control, Computing and Electronics Engineering (ICCCCEE), 2017 International Conference on. IEEE, 1-5.

D Baswaraj, A Govardhan, and P Premchand. 2012. Active contours and image segmentation: The current state of the art. Global Journal of Computer Science and Technology (2012).

Sean Borman. 2004. The expectation maximization algorithm—a short tutorial. Submitted for publication (Jan. 2004), 1-9.

Yanping Chen, Adena Why, Gustavo Batista, Agenor Mafra-Neto, and Eamonn Keogh. 2014. Flying insect detection and classification with inexpensive sensors. Journal of visualized experiments: JoVE 92 (Oct. 2014), 52111.

Corinna Cortes and Vladimir Vapnik. 1995. Support-vector networks. Machine learning 20, 3 (Sep. 1995), 273-297.

Jia Deng, Wei Dong, Richard Socher, Li-Jia Li, Kai Li, and Li Fei-Fei. Jun. 20-25, 2009. Imagenet: A large-scale hierarchical image database. In Computer Vision and Pattern Recognition CVPR 2009. IEEE Conference on. IEEE, 248-255.

Anita Dixit and Nagaratna P Hegde. 2013. Image texture analysis-survey. In Advanced Computing and Communication Technologies (ACCT), Apr. 2013 Third International Conference on. IEEE, 69-76.

Colin Favret and Jeffrey M Sieracki, Machine vision automated species identification scaled towards production levels. Systematic Entomology 41, Oct. 1, 2015, 133-143.

Masataka Fuchida, Thejus Pathmakumar, Rajesh Elara Mohan, Ning Tan, and Akio Nakamura. 2017. Vision-based perception and classification of mosquitoes using support vector machine. Applied Sciences 7:1, Jan. 2017, 51.

Robert M Haralick, Karthikeyan Shanmugam, et al. 1973. Textural features for image classification. IEEE Transactions on systems, man, and cybernetics 6 (Nov. 1973), 610-621.

PS Hiremath and Rohini A Bhusnurmath. 2013. Texture Image Classification Using Nonsubsampled Contourlet Transform and Local Directional Binary Patterns. International Journal 3, 7 (2013).

T Huang, GJTGY Yang, and G Tang. 1979. A fast two-dimensional median filtering algorithm. IEEE Transactions on Acoustics, Speech, and Signal Processing 27, 1 (Feb. 1979), 13-18.

PG Jupp. Sep.-Oct. 1996. Mosquitoes of Southern Africa: Culicinae and Toxorhynchitinae. Hartebeespoort.

Maxime Martineau, Donatello Conte, Romain Raveaux, Ingrid Arnault, Damien Munier, and Gilles Venturini. A survey on image-based insect classification. Pattern Recognition 65, May 2017, 273-284.

Conor J McMeniman, Román A Corfas, Benjamin J Matthews, Scott A Ritchie, and Leslie B Vosshall. 2014. Multimodal integration of carbon dioxide and other sensory cues drives mosquito attraction to humans. Cell 156, 5 (Feb. 27, 2014), 1060-1071.

Sebastian Mika, Gunnar Ratsch, Jason Weston, Bernhard Scholkopf, and Klaus-Robert Mullers. Fisher discriminant analysis with kernels. In Neural Networks for Signal Processing IX, Aug. 25, 1999. Proceedings of the 1999 IEEE Signal Processing Society Workshop. IEEE, 41-48.

Mona Minakshi, Pratool Bharti, and Sriram Chellappan. Identifying mosquito species using smart-phone cameras. In Networks and Communications (EuCNC), Jun. 2017 European Conference on. IEEE, 1-6.

Haripriya Mukundarajan, Felix JH Hol, Erica A Castillo, Cooper Newby, and Manu Prakash. Mar. 2016. Using Mobile Phones as Acoustic Sensors for the Surveillance of Spatio-temporal Mosquito Ecology.

Munoz, R. Boger, S. Dexter, R. Low, and J. Li. Image Recognition of Disease-Carrying Insects: A System for Combating Infectious Diseases Using Image Classification Techniques and Citizen Science. Jan. 2018.

Luis Perez and Jason Wang. 2017. The effectiveness of data augmentation in image classification using deep learning. arXiv preprint arXiv:1712.04621 Dec. 2017.

Antonio Rodríguez García, Frederic Bartumeus, and Ricard Gavaldà Mestre. 2016. Machine learning assists the classification of reports by citizens on diseasecarrying mosquitoes. In SoGood 2016: Data Science for Social Good: Proceedings of the First Workshop on Data Science for Social Good co-located with European Conference on Machine Learning and Principles and Practice of Knowledge Dicovery in Databases (ECML-PKDD 2016): Riva del Garda, Italy, Sep. 19, 2016. CEURWS. org, 1-11.

Michael W Schwarz, William B Cowan, and John C Beatty. 1987. An experimental comparison of RGB, YIQ, LAB, HSV, and opponent color models. ACM Transactions on Graphics (TOG) 6, 2, Apr. 1987, 123-158.

Karen Simonyan and AndrewZisserman. 2014. Very deep convolutional networks for large-scale image recognition. arXiv preprint arXiv:1409.1556 Sep. 2014.

Irwin Sobel. 2014. An Isotropic 3x3 Image Gradient Operator. Feb. 2014.

Chris Stauffer andWEric L Grimson. 1999. Adaptive background mixture models for real-time tracking. In Computer Vision and Pattern Recognition, Jun. 1999. IEEE Computer Society Conference on., vol. 2. IEEE, 246-252.

Brandyn White and Mubarak Shah. 2007. Automatically tuning background subtraction parameters using particle swarm optimization. In Multimedia and Expo, Jul. 2007 IEEE International Conference on. IEEE, 1826-1829.

André Barretto Bruno Wilke, Rafael de Oliveira Christe, Laura Cristina Multini, Paloma Oliveira Vidal, Ramon Wilk-da Silva,

(56) References Cited

OTHER PUBLICATIONS

Gabriela Cristina de Carvalho, and Mauro Toledo Marrelli. 2016. Morphometric wing characters as a tool for mosquito identification. PloS one 11, 8 (Aug. 2016), e0161643.

Mona Minakshi, Pratool Bharti, Sriram Chellappan. 2018. Leveraging Smart-Phone Cameras and Image Processing Techniques to Classify Mosquito Species. MobiQuitous '18 Proceedings of the 15th EAI International Conference on Mobile and Ubiquitous Systems: Computing, Networking and Services, pp. 77-86, Nov. 5-7, 2018.

He, Kaiming, Georgia Gkioxari, Piotr Dollár, and Ross Girshick. "Mask r-cnn." In Proceedings of the IEEE international conference on computer vision, pp. 2961-2969. Mar. 2017.

He, Kaiming, Xiangyu Zhang, Shaoqing Ren, and Jian Sun. "Deep residual learning for image recognition." In Proceedings of the IEEE conference on computer vision and pattern recognition, pp. 770-778. Jun. 2016.

Lin, Tsung-Yi, Michael Maire, Serge Belongie, James Hays, Pietro Perona, Deva Ramanan, Piotr Dollár, and C. Lawrence Zitnick. "Microsoft coco: Common objects in context." In European conference on computer vision, pp. 740-755. Springer, Cham, Sep. 2014.

Park, Junyoung, et al. "Classification and Morphological Analysis of Vector Mosquitoes using Deep Convolutional Neural Networks." Scientific Reports 10.1 (Jan. 2020): 1-12.

Kang, Jaeyong, and Jeonghwan Gwak. "Ensemble of instance segmentation models for polyp segmentation in colonoscopy images." IEEE Access 7 (Feb. 2019): 26440-26447.

Motta, Daniel, et al. "Application of convolutional neural networks for classification of adult mosquitoes in the field." PloS one 14.1 (Jan. 2019): e0210829.

Dai, Zhenzhen, et al. "Segmentation of the Prostatic Gland and the Intraprostatic Lesions on Multiparametic MRI Using Mask R-CNN." Advances in Radiation Oncology (May-Jun. 2020).

Lorenz, Camila, Antonio Sergio Ferraudo, and Lincoln Suesdek. "Artificial Neural Network applied as a methodology of mosquito species identification." Acta Tropica 152 (Dec. 2015): 165-169.

Xu, Xuanang, et al. "Efficient multiple organ localization in ct image using 3d region proposal network." IEEE transactions on medical imaging 38.8 (Jan. 2019): 1885-1898.

Stewart, M., "Simple Introduction to Convolutional Nueral Networks", posted Feb. 26, 2019. Available on-line: https://towardsdatascience.com/simple-introduction-to-convolutional-neural-networks-cdf8d3077bac.

Minakshi, Mona, Pratool Bharti, and Sriram Chellappan. "Leveraging smart-phone cameras and image processing techniques to classify mosquito species." Proceedings of the 15th EAI International Conference on Mobile and Ubiquitous Systems: Computing, Networking and Services. 77-86 (ACM, Nov. 2018).

Minakshi, Mona, et al. "Automating the Surveillance of Mosquito Vectors from Trapped Specimens Using Computer Vision Techniques." arXiv preprint arXiv:2005.12188 (May 2020).

Vasconcelos, Dinarte, et al. "LOCOMOBIS: a low-cost acoustic-based sensing system to monitor and classify mosquitoes." 2019 16th IEEE Annual Consumer Communications & Networking Conference (CCNC). IEEE, Jan. 2019.

Ravi, Prashant, Uma Syam, and Nachiket Kapre. "Preventive detection of mosquito populations using embedded machine learning on low power IotT platforms." Proceedings of the 7th Annual Symposium on Computing for Development. Nov. 2016.

Lin, Tsung-Yi, et al. "Feature pyramid networks for object detection." Proceedings of the IEEE conference on computer vision and pattern recognition. Apr. 2017.

The importance of learning identification of larvae and adult mosquitoes. Smithsonian homepage. https://www.si.edu/. ID.555636. pdf. Sep. 22, 2017. https://juniperpublishers.com/jojnhc/pdf/ JOJNHC. MS.

Ronneberger, Olaf, Philipp Fischer, and Thomas Brox. "U-net: Convolutional networks for biomedical image segmentation." International Conference on Medical image computing and computer-assisted intervention. Springer, Cham, Nov. 2015.

Dai, J., He, K. & Sun, J. Instance-aware semantic segmentation via multi-task network cascades. In Proceedings of the IEEE Conference on Computer Vision and Pattern Recognition 3150-3158 (Jun. 2016).

Li, Yi, et al. "Fully convolutional instance-aware semantic segmentation." Proceedings of the IEEE Conference on Computer Vision and Pattern Recognition. Apr. 2017, 2359-2367.

Pinheiro, P. O., Collobert, R. & Dollár, P. Learning to segment object candidates. In Advances in Neural Information Processing Systems 1990-1998 (Dec. 2015).

Girshick, R. Fast R-CNN. In Proceedings of the IEEE International Conference on Computer Vision 1440-1448 (2015).

Ren, Shaoqing, et al. "Faster r-cnn: Towards real-time object detection with region proposal networks." Advances in neural information processing systems. Dec. 2015.

Dutta, Abhishek, and Andrew Zisserman. "The VIA annotation software for images, audio and video." Proceedings of the 27th ACM International Conference on Multimedia. Oct. 2019.

Lin, T.-Y., Goyal, P., Girshick, R., He, K. & Dollár, P. Focal loss for dense object detection. In Proceedings of the IEEE International Conference on Computer Vision, 2980-2988 (Aug. 2017).

Mask RCNN code. https://github.com/matterport/Mask_RCNN Mar. 31, 2019.

IFAS. Florida medical entomology laboratory. 2019. https://fmel.ifas.ufl.edu/mosquito-guide/species-identification-table/species-identification-table-adult/.

Glyshaw, P. & Wason, E. "Anopheles quadrimaculatus" 2013. https://animaldiversity.org / accounts/Anopheles_quadrimaculatus/ edu/ mosquito-guide/species-identification-table/species-identification-table-adult/.

Dharmasiri, A. G. et al. First record of anopheles stephensi in Sri Lanka: a potential challenge for prevention of malaria reintroduction. Malaria J. 16, 326 (Aug. 2017).

IFAS. Florida medical entomology laboratory. 2019. https://fmel.ifas.ufl.edu/publication/buzz-words/buzz-words-archive/is-it-culex-tarsalis-or-culex-coronator/.

Floore, T. A., Harrison, B. A. & Eldridge, B. F. The anopheles (anopheles) crucians subgroup in the united states (diptera: Culicidae). Tech. Rep, Walter Reed Army Inst Of Research Washington Dc Department of Entomology, Jan. 1976.

Smithsonian Institution. Bombus (Fervidobombus) fervidus fervidus Collection Date: Jun. 20, 1909 https://collections.si.edu/search/results.htm? fq=tax_kingdom%3A%22animalia%22&fq=online_media_type%3A%22Images%22&fq=datasource%3A%22NMNH+-+Entomology+Dept.%22&q=NMNH-USNMENT01001576&gfq=CSILP_6.

Smithsonian Institution. Bombus (Pyrobombus) huntii. Collection Date: [Not Stated] https://collections.si.edu/search/results.htm?fq=tax_kingdom%3A%22Animalia%22&fq=online_media_type%3A%22Images%22&fq=data_source%3A%22NMNH+-+Entomology+Dept.%22&q=NMNH-USNMENT01006317&gfq=CSILP_6.

\* cited by examiner

530

Wing

540

Legs

520

Abdomen

510

Thorax

SYSTEMS AND METHODS OF ENTOMOLOGY CLASSIFICATION BASED ON EXTRACTED ANATOMIES

CROSS REFERENCE TO RELATED APPLICATIONS

This application claims priority to and incorporates by reference U.S. Provisional Patent Application Ser. No. 62/970,026 filed on Feb. 4, 2020.

BACKGROUND

Taxonomy is the process of classifying organisms in nature. Entomology is the study of insect organisms. Taxonomy in the context of entomology is a relatively obscure discipline in the era of modern sciences. Very few people want their professional careers spent with hours poring through a microscope trying to identify what genus and species an insect is. In the context of mosquitoes, there are close to 4500 different species of mosquitoes, and training to identify all of these mosquitoes is hard if not impossible. In countries like India, Bangladesh and even the US, it is simply not possible to train professionals to identify all mosquitoes that are endemic in these countries (e.g., there are 400 species of mosquitoes endemic to India; and about 150 species in the US). With increasing travel and global connectivity among nations, mosquitoes can invade to newer places, and identifying the "new" mosquitoes becomes impossible by local professionals. Mosquitos and other insects are considered "vectors" because they can carry viruses, bacteria, and strains of diseases and transmit them to humans. The term "vector" is therefore given its broadest meaning in the art of infectious diseases.

Modern entomology updates have focused on eliminating or minimizing human involvement in classifying genus and species of mosquitoes during disease outbreak. There are close to 4500 different species of mosquitoes in the world spread across 45 or so genera. Out of these, only handfuls of species across three genus types spread the deadliest diseases. These mosquitoes belong to *Aedes* (Zika, Dengue, Chikungunya, Yellow Fever), *Culex* (West Nile Virus, and EEE), and *Anopheles* (Malaria). Within these three genera, the deadliest species are *Aedes aegypti, Aedes albopictus, Culex nigripalpus, Anopheles gambiae* and *Anopheles stephensi*. When a mosquito-borne disease, say Dengue affects a region, then identifying the presence of the particular vectors for Dengue (i.e., *Aedes aegypti* and *Aedes albopictus*) becomes important. This is hard and expensive. For instance in India, there are close to 450 types of mosquitoes spread all over. Accordingly, public health experts lay traps in disease prone areas, and sometimes hundreds of mosquitoes get trapped. Now, however, they can identify which of those is the genus and species they are looking for. Because, once they identify the right mosquitoes, they can then take those mosquitoes to the lab for DNA testing etc. to see if the pathogen (i.e., virus) is there within the trapped mosquito. Naturally, if they find a reasonable large number of those mosquitoes with the virus in them, there is a public health crisis, and corrective action needs to be taken.

Other efforts have focused on detecting foreign mosquitoes at borders. This is a problem that is attracting a lot of global attention—the need to identify if a mosquito in borders of a nation (land or sea or air or road) is a foreign mosquito. For instance, consider a scenario in which mosquitos, e.g., both a domestic vector and one non-native to the US, are on a vehicle entering the US borders.

Assuming that borders do have mosquito traps, it is likely that this "new" breed of mosquito could get trapped along with other local mosquitoes. The question here is how public health authorities identify that a "foreign" mosquito is in one such trap. Current entomology classification systems would require going periodically to these traps, collecting and studying subjects through a microscope, and identifying specimens one by one. This is impossibly cumbersome if the goal is to only detect a particular type of "foreign" mosquito.

Current disease models rely upon proper classification of infection vectors. The entomology classification systems need to be improved for use in specialized and detail intensive instances, such as the hypothetical above. A need exists in the art of entomological classification to include algorithms that are adaptable for use in resolving important, yet hard to pinpoint issues, such as identifying the hypothetical "foreign" mosquito that did indeed get trapped. Updated algorithms are needed to provide researchers with options in entomological classification for specialized situations, such as the hypothetical random occurrence of new insects affecting a local population.

Continuing with the "foreign" mosquito example, the art of entomological classifications needs improved techniques and models that have been trained with images of the foreign mosquito (provided by international partners) to identify the genus and species directly from initial observations. In the alternative, a need should be met to enable running the foreign mosquito through models trained with other mosquitoes. These techniques would allow researchers to notify public health officials that a new mosquito, that appears to be previously unknown in a given location, has been currently trapped. In either case, there is significant benefit for public health at borders.

As detailed in this disclosure, to address the above noted inadequacies, digitizing anatomies of mosquito specimens across the globe (with citizen and expert involvement) will help create a massive repository of mosquito anatomy images tagged with genus and species types. This repository could then be used for training personnel, and also for automatic identification using algorithms in this disclosure (when a picture is uploaded). For instance and without limiting this disclosure, the Florida Medical Entomology Lab in Vero Beach trains a very small number of personnel each year (both international and also domestic military personnel) in the detailed art of insect classification. From prior investigations, space is very limited, and many are turned away from these kinds of training programs. With a digital repository in place, the training programs can be globally expanded as well with potentially thousands of images to train interested personnel.

The need for these kinds of improvements in entomological classification is apparent in at least one example. Many states and counties in India (especially those at borders) have been and are currently willing to pay for such a service. Such a service with appropriate mosquito traps and can be deployed in international airplanes, ships and buses.

In another expression of the needs in this arena, soldiers going to countries where mosquito-borne diseases are common are routinely trained to help local communities identify mosquitoes and other vectors for disease. A digital repository can train soldiers remotely without having to physically travel to a location in need for these services. Furthermore, soldiers and even personnel from government agencies engaged in traveling and residing overseas might benefit from a trap in the bases and/or homes that can tell them decipher the type of mosquitoes trapped in their vicinity, and how dangerous they are.

BRIEF SUMMARY OF THE DISCLOSURE

This disclosure presents a system to design state of the art artificial intelligence (AI) techniques, namely techniques based on mask region-based convolutional neural networks to extract anatomical components of mosquitoes from digital images and archiving them permanently based on genus, species and other taxonomies.

In one embodiment, a system for identifying a genus and species of an insect includes an imaging device configured to generate images of the insect. A computer processor is connected to memory storing computer implemented commands in software, and the memory receives the images, wherein the software implements a following computerized method with respective images beginning with a step of applying a first convolutional neural network to the respective images to develop feature maps directed to anatomical pixels in the respective images that correspond to a body part of the insect. A computer then applies anchors to the feature maps, wherein the anchors identify portions of respective layers of image data in the feature maps that contain respective anatomical pixels for respective body parts. Generating a mask allows the system to segment the respective anatomical pixels from the respective layers. The system extracts fully connected layers from the respective layers that have had the first convolutional neural network applied thereto. The fully connected layers are applied to a regressor network and a classification network, wherein generating the mask for segmenting, applying the fully connected layers to a regressor network, and applying the fully connected layers to a classification network are parallel operations conducted by the software.

Also in the embodiments, systems and methods are disclosed for extracting information about anatomical components of a living creature from a digital image. The method includes training a mask-region based convolutional neural network with a set of training images segmented with computerized algorithms that identify ground truth anatomical components to a set degree of accuracy. The training includes classifying respective anatomical components in the training images and comparing the training images to the ground truth images; tightening bounding boxes surrounding the anatomical components in the digital images; and generating a mask for use in extracting information of a second set of images.

BRIEF DESCRIPTION OF THE FIGURES

The patent application file or the patent issuing therefrom contains at least one drawing executed in color. Copies of this patent or patent application publication with the color drawing(s) will be provided by the Office upon request and payment of the necessary fee. Reference will now be made to the accompanying drawings, which are not necessarily drawn to scale.

DETAILED DESCRIPTION

Figure 1:
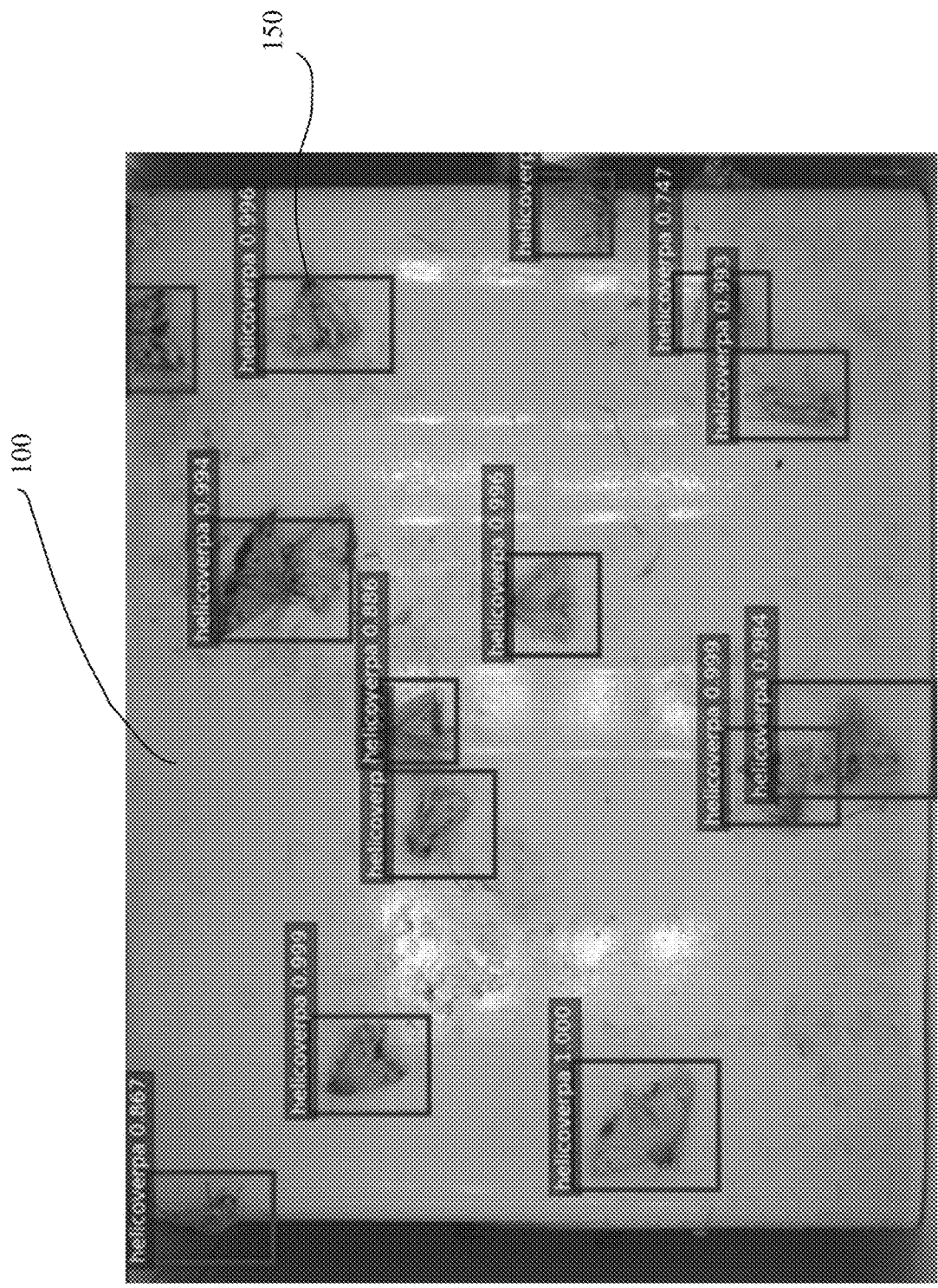
FIG. 1 is a PRIOR ART schematic view of a digital, or "smart" trap that captures pests for use with this disclosure.

This disclosure illustrates a Deep Neural Network Framework to extract anatomical components, such as but not limited to, thorax, wings, abdomen and legs from mosquito images. The technique is based on the notion of Mask R-CNN 800 of FIG. 8, wherein artificial intelligence iteratively learns feature maps 808 from images 802, emplaces anchors (shown as bounding boxes 812 in the Figures but can be any shape) around foreground components, followed by segmenting 820 and classification 824 of pixels corresponding to the anatomical components within anchors. In some embodiments, results of this disclosure show that the techniques are favorable when interpreted in the context of being able to glean descriptive morphological markers for classifying mosquitoes.

This disclosure documents systems and methods that have generated close to 30,000 digital images of mosquitoes (taken via smartphones) that are tagged based on genus and species type. This disclosure explains at least one method to extract the most critical anatomical components of mosquitoes—namely wings, thorax, abdomen and legs that are vital for human vision based classification. Then, the disclosure shows AI techniques to classify the genus and species of a mosquito (from a digital image) by focusing on their unique anatomies rather than the whole body alone. This contextual based classification will give much more superior results.

Figure 8:
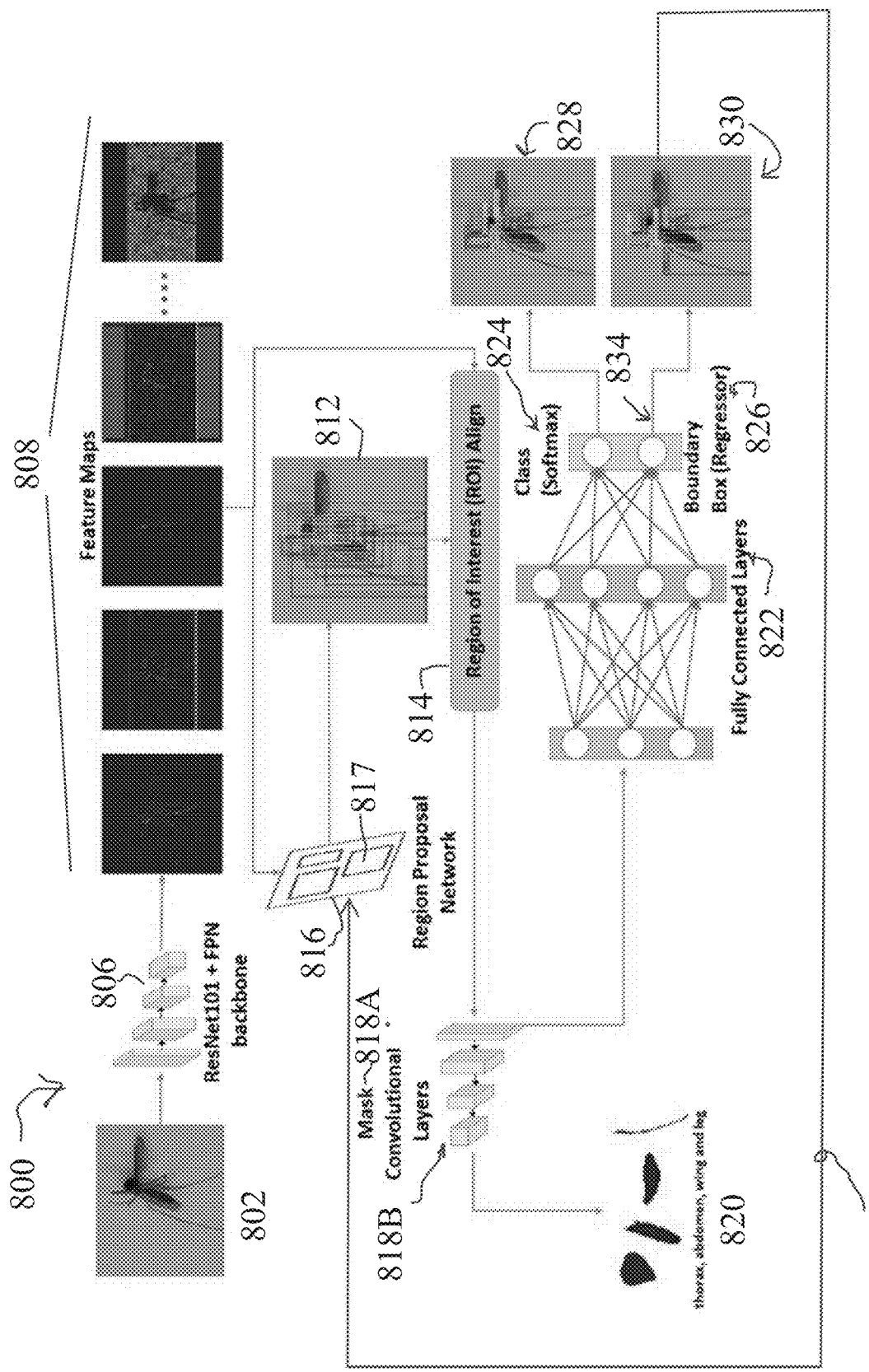
FIG. 8 is a schematic diagram of a convolutional neural network ("CNN") used in a computer environment configured to implement the computerized methods of this disclosure.

A general discussion of CNNs and associated terminology can be found in numerous references cited below. For example, Reference 35 (Shepard) explains how filters, made of multiple kernels (weighted matrices) are convolved onto original images to create feature maps of numerous layers and adaptable data density. Shepard explains using the feature maps to pool certain layers with techniques such as max pooling, that separates out those feature maps with maximum values to reduce complexity. Rectified Non-Linear Unit (Re-LU) data sets are added to the feature maps to identify areas that should be accounted for but were missed when the changes from one pixel to the next were below a filtering threshold. In very simplistic terms, the Re—Lu is an activation function operated on the image to produce layers that may be appended to the feature maps as shown in FIG. 8. Generally, in some non-limiting embodiments, the Re-LU may retain a certain filter's value at a respective output matrix index or insert a zero if that certain index value is negative. The overall concept of a convolutional neural network, therefore, incorporates convolutional layers as feature maps of the original image, pooling layers and ReLU layers for added detail, as well as fully connected layers that are data rich outputs that are combined. As noted at Ref. 35 (Stewart), the fully connected layers, such as those shown in the non-limiting example of FIG. 8, aggregate all information into a finally replicated image.

This disclosure presents a system to design state of the art AI techniques, namely techniques based on Mask Region-Based Convolutional Neural Networks, to extract anatomical components of mosquitoes from digital images and archiving them permanently based on genus, species and other taxonomies. Investigators using the techniques of this disclosure have generated close to 30,000 digital images of mosquitoes (taken via smartphones) that are tagged based on genus and species type. Once anatomies of interest are extracted, this disclosure explains novel AI techniques to design a model that can recognize genus and species types of mosquitoes. Should the methods and systems described herein be popular among citizens and experts, and if investigation agencies can recruit entomologists to use these techniques, there is every expectation to globally scale up the effort to include many more mosquito types and improve models over time.

In some aspects, the present disclosure relates to computerized apparatuses, computer implemented methods, and computerized systems that use digital image analysis to identify species of insect specimens, such as, but not limited to mosquitos. The disclosure presents a system wherein a user (expert or an ordinary citizen) takes a photo of a mosquito or other pests, using a smart-phone, and then the image is immediately sent to a central server along with GPS information data of the smart-phone.

The server will implement algorithms described in this disclosure to a) identify the genus of the mosquito; b) identify the species of the mosquito; c) separate the body parts of the image into objects of interest like wings, legs, proboscis, abdomen, scutum etc.; d) give feedback on species and genus back to user, along with information as to what diseases the species carry, and more interesting information like flight range etc. Potential uses are in mosquito identification, since it is a painful and cognitively demanding problem now. School districts could also use this software application to teach kids about biology and other areas of science, given that these kinds of scientific analysis skills may eventually be mandatory for schools in many areas. Defense and Homeland Security agencies and other government agencies may see a need for the computerized application described herein.

One non-limiting value proposition of this disclosure is the ability to bypass humans (that peer through a microscope currently) for classification, and instead use digital cameras and proposed techniques for automated classification of genus and species type. A secondary value proposition is the ability of a system with large scale citizen and expert generated imagery, with tagging, to start digitizing anatomies of mosquitoes across the globe. This database could prove invaluable for training, and global information sharing in the context of mosquito, and especially vector surveillance.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways. For example, the test results and examples all pertain to identification of genus and species of mosquitos from the mosquito traits and features extracted from digital images. The techniques and concepts utilized and claimed in this disclosure, however, are not limited to mosquitos, but can be used with other kinds of identification processes for other animals, humans, plants and the like.

FIG. 1 illustrates a prior art system that utilizes a trap 100 for pests that captures the pests, takes their picture 150 using a built-in camera, and sends the pictures to the cloud. In the cloud, algorithms that are implemented by computers and servers on various networks are designed to identify the type of pest. Information is fed back to farmers who can then plan accordingly to treat their crops. However, anatomies are not extracted in this product.

Figure 2:
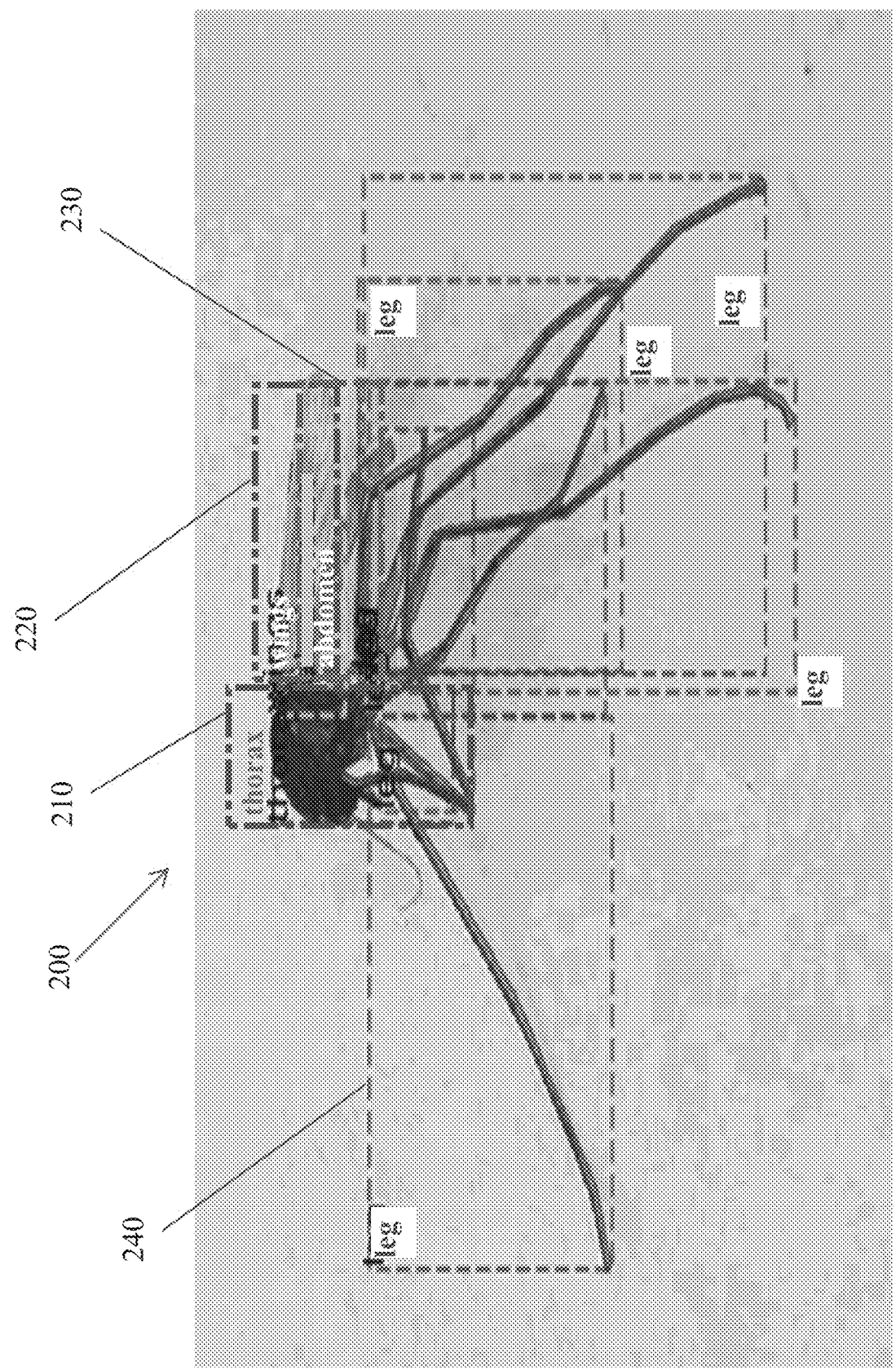
FIG. 2 is a pixel-wise segmentation of a pest using boxes within a neural network in accordance with this disclosure.

FIG. 2 illustrates results of an approach used in one non-limiting example of digital segmentation of an insect 200, i.e., the mosquito as shown, utilizing convolutional neural networks (CNNs). This procedure is based on the notion of Mask R-CNN described in the article cited as He, Kaiming, Georgia Gkioxari, Piotr Dollár, and Ross Girshick. "Mask r-cnn." In Proceedings of the IEEE international conference on computer vision, pp. 2961-2969. 201, cited as Ref. 33. Another example of CNNs is discussed in an online resource, entitled "Simple Introduction to Convolutional Neural Networks" by Dr. Matthew Stewart, cited as Ref. 35. Both of these articles are incorporated by reference as if each is set forth in its entirety herein. This disclosure leverages such advances in convolutional neural networks (CNNs) and segments pixels containing each anatomical component of interest by adding a branch for predicting an object mask (i.e., pixel-wise segmentation discussed further in regard to FIG. 8) in parallel with the existing branch for recognizing the bounding box of prior art CNNs. FIG. 2 illustrates one step of a CNN anatomical segmentation that uses regressively trained bounding boxes 210, 220, 230, 240 to isolate and identify corresponding pixels on each of a respective thorax, wings, abdomen, and legs portion of an image. As noted above, the term "bounding boxes" is illustrative for example only, as the outlining used for segmenting an anatomy may take any shape, and boxes or rectangles of FIG. 2 are not limiting of this disclosure.

In this approach, several challenging steps need to be executed. A first step includes training the model using pretrained convolutional neural networks (CNNs) to generate proposals about certain regions where there might be an object within the image. Without limiting this disclosure, one example embodiment used ResNet101 as a backbone convolutional model. Initialization of the model was done using the pretrained MS COCO dataset weights. The MS COCO data set has been disclosed at Lin, Tsung-Yi, Michael Maire, Serge Belongie, James Hays, Pietro Perona, Deva Ramanan, Piotr Dollar, and C. Lawrence Zitnick, "Microsoft coco: Common objects in context" in European conference on computer vision, pp. 740-755; Springer, Cham, 2014, cited at Ref. 34, which is incorporated by reference in its entirety as if set forth fully herein. MS COCO dataset is large scale object detection dataset. It contains 1.5 million object instances, and 80 object categories.

ResNet has been generally described at He, Kaiming, Xiangyu Zhang, Shaoqing Ren, and Jian Sun. "Deep residual learning for image recognition." In Proceedings of the IEEE conference on computer vision and pattern recognition, pp. 770-778. 2016, which is incorporated by reference in its entirety as if set forth fully herein and cited at Ref. 33. ResNet is characterized in part as having a very deep network and introduces a residual connection to get the input from the previous layer to the next layer. The residual connection helps in solving gradient vanishing problems by detecting the smallest of differences between layers of the convolution. The next step is to design an object detector network that does three tasks: classifying the bounding boxes 210, 220, 230, 240 with respective anatomies, tightening the boxes, and generating a mask 818 (i.e., pixel-wise segmentation 820) of each anatomical component. In constructing the architecture of the object detector network, non-limiting examples of this disclosure have used per-pixel sigmoid, and binary cross-entropy loss function (to identify the "k" anatomical components) and rigorously train them.

Figure 3:
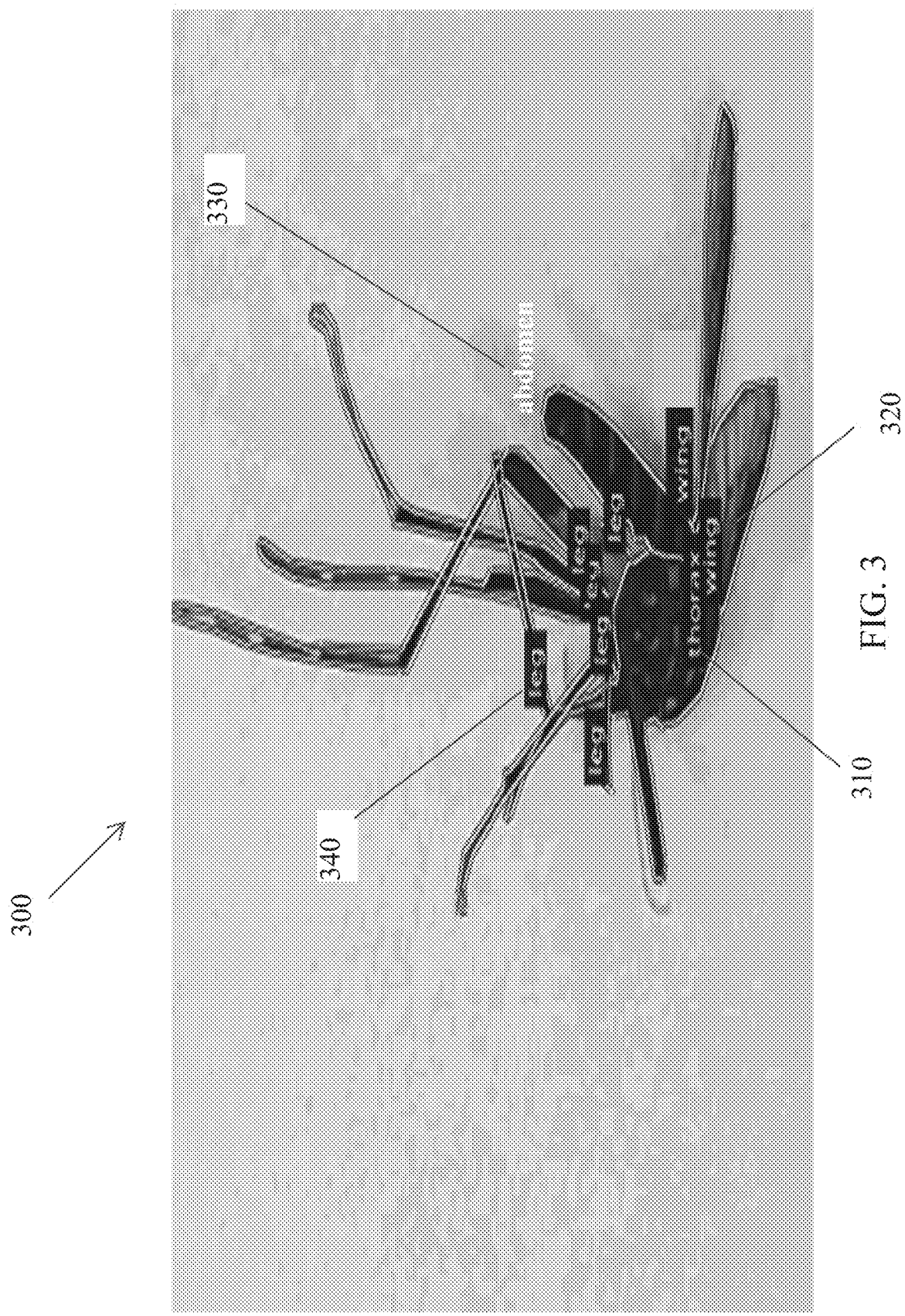
FIG. 3 is a schematic view of an output of a neural network that segments pixels of respective pest body parts and annotates an image of the pest in accordance with this disclosure.

In regard to generating training data sets, non-limiting examples utilize tools that create a mask for each anatomical component in a subject dataset. To start the training, the procedure first annotated 571 mosquito images, using VGG Image annotator tool which is itself a very tedious job. An example of an annotated image 300 is shown in FIG. 3. Out of 571 mosquito images that were previously annotated by experts, 404 images were separated out as the training images and 167 images are separated out as the validation images. Next, the methods and systems of this disclosure iterate a model to optimize weights and hyper-parameters from these known-to-be-accurate sets of training data. For example, embodiments herein have optimized hyper-parameters like base feature extractor model, learning rate, momentum, optimizer, steps per epoch, validation steps and number of epochs, which are all parameters to be set in convolutional neural networks (CNNs) used herein. Example, non-limiting details are below in Table 1.

TABLE 1

| Parameter | Value |
| --- | --- |
| Optimizer | Adam |
| Momentum | 0.9 |
| Learning rate | 1e−4 for first 50 epochs, 1e−5 for next 50 and 1e−6 for next 100 epochs |
| Batch Size | 2 |
| Steps per epoch | 202 |
| Validation steps | 84 |
| Number of epochs | 200 |

The metrics to measure the accuracy of mask R-CNN algorithm is mAP (Mean Average Precision). It was calculated by taking the mean of all the average precision across all classes over all IoU thresholds, and is 0.833. The metric IoU measures the intersection of ratio of pixels that belong to the ground-truth of the object in the bounding box and the union of the predicted and the ground truth ratio of pixels in the box. In one design, the IoU threshold was set as 0.75. FIG. 3 illustrates how a training image 300 can be annotated to illustrate anatomical parts represented by respective anatomy part pixels 310, 320, 330, 340. In one non-limiting embodiment, a computer implemented software package also adds the written anatomy name for the part of the body that has been segmented for training purposes as shown in FIG. 3. With the accurately segmented images for examples, each of the hyperparameters of Table 1 may be optimized to repeat the results of the trained data set.

Figure 4:
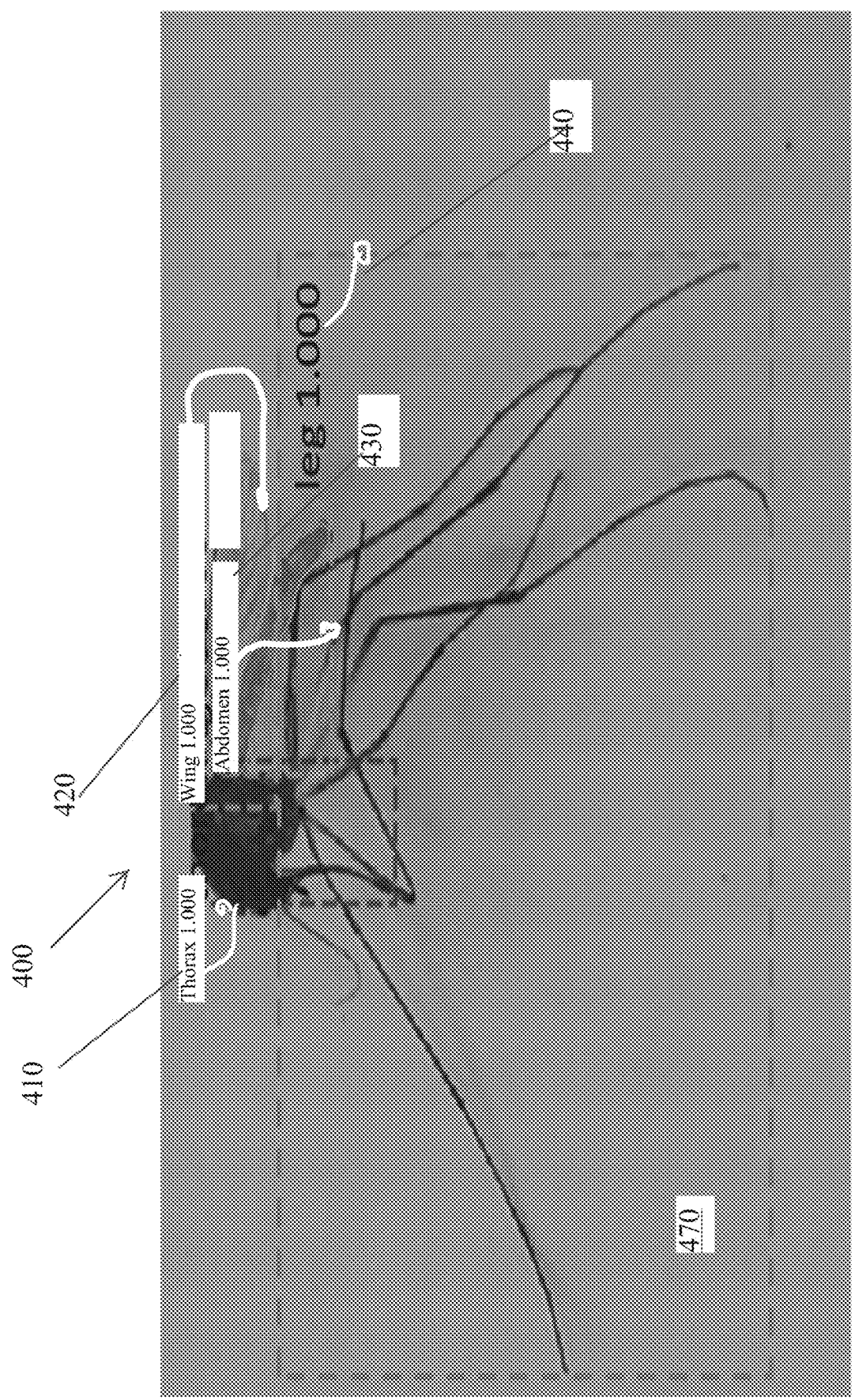
FIG. 4 is a schematic view of a masked anatomy result of a convolutional neural network operation on a digital image according to this disclosure.
Figure 5C:
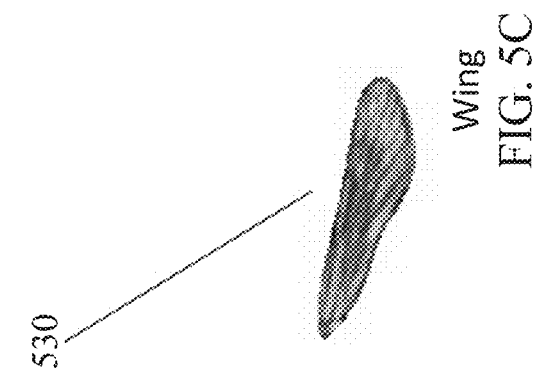
FIG. 5C is a schematic view of a cropped wing anatomy result of a convolutional neural network operation on a digital image according to this disclosure.
Figure 5D:
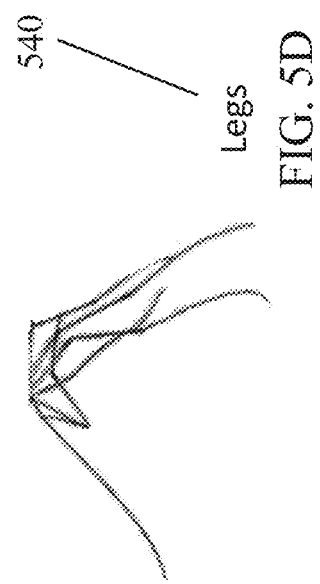
FIG. 5D is a schematic view of cropped thorax anatomy result of a convolutional neural network operation on a digital image according to this disclosure.
Figure 5B:
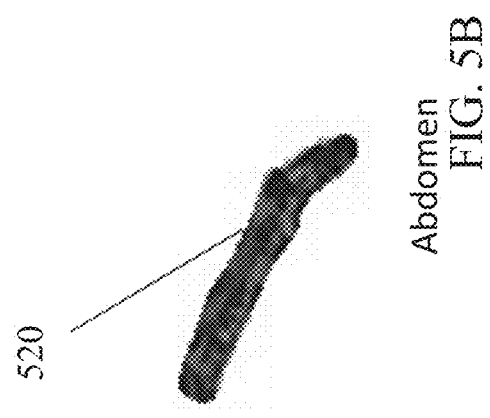
FIG. 5B is a schematic view of a cropped abdomen anatomy result of a convolutional neural network operation on a digital image according to this disclosure.
Figure 5A:
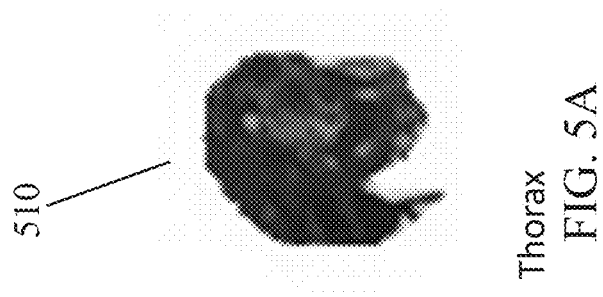
FIG. 5A is a schematic view of a cropped thorax anatomy result of a convolutional neural network operation on a digital image according to this disclosure.

FIG. 4 shows the masked anatomy 400 in a result in which bounding boxes 410, 420, 430, 440 are honed in via regressive processes of a convolutional neural network on pixels that correspond to particular parts of the anatomy, and FIGS. 5A-5D illustrate the cropped anatomy results for a specimen's thorax pixels 510, abdomen pixels 520, wing pixels 530, and leg pixels 540, after the convolutional neural networks have found these respective pixel sets via the procedure outlined in FIG. 8 and background pixels 470 have been extracted. Results are subject to cloud storage over a network.

Figure 6C:
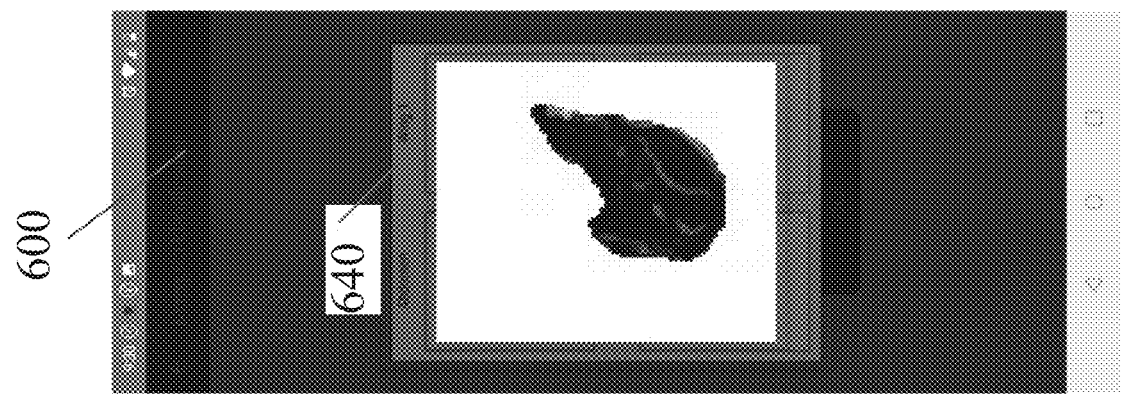
FIG. 6C is a third screen shot of a software application ("app") display using in conjunction with the systems and methods disclosed herein.
Figure 6B:
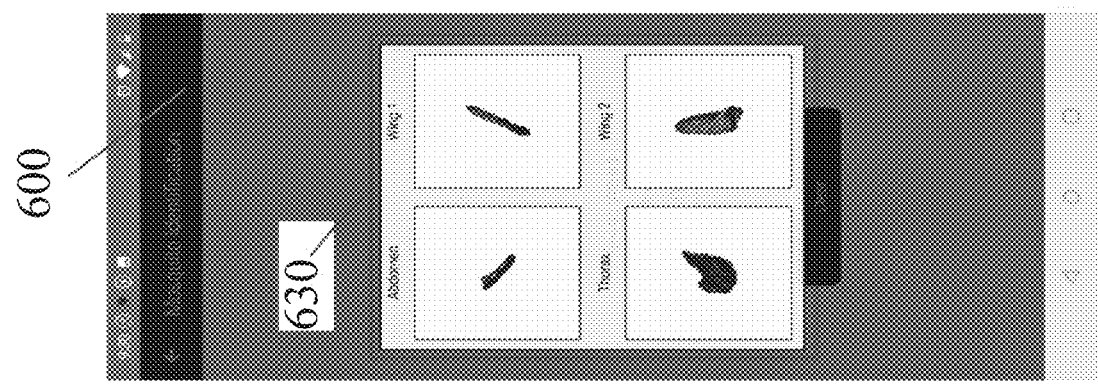
FIG. 6B is a second screen shot of a software application ("app") display using in conjunction with the systems and methods disclosed herein.
Figure 6A:
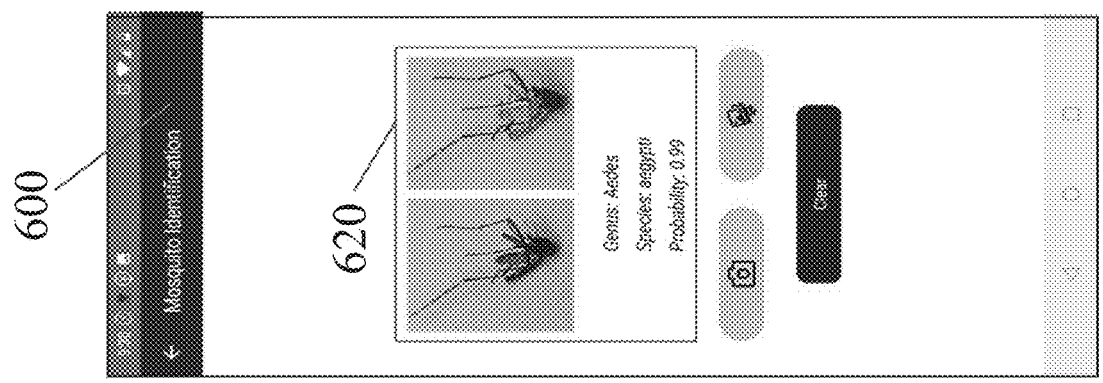
FIG. 6A is a first screen shot of a software application ("app") display using in conjunction with the systems and methods disclosed herein.
Figure 7C:
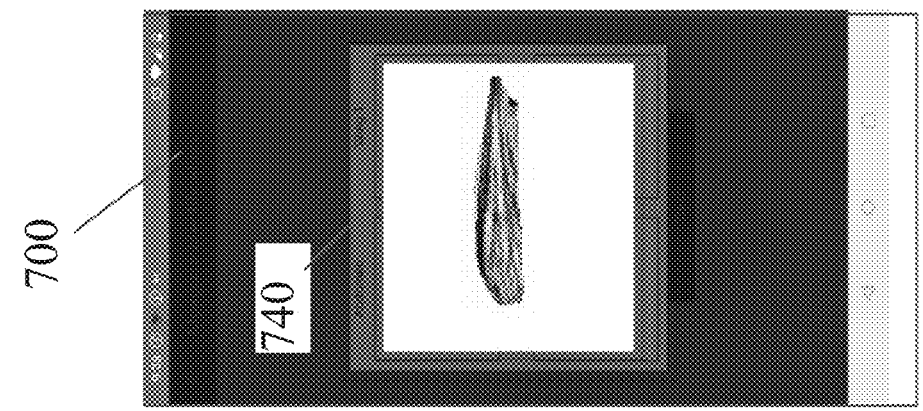
FIG. 7C is a sixth screen shot of a software application ("app") display using in conjunction with the systems and methods disclosed herein.
Figure 7B:
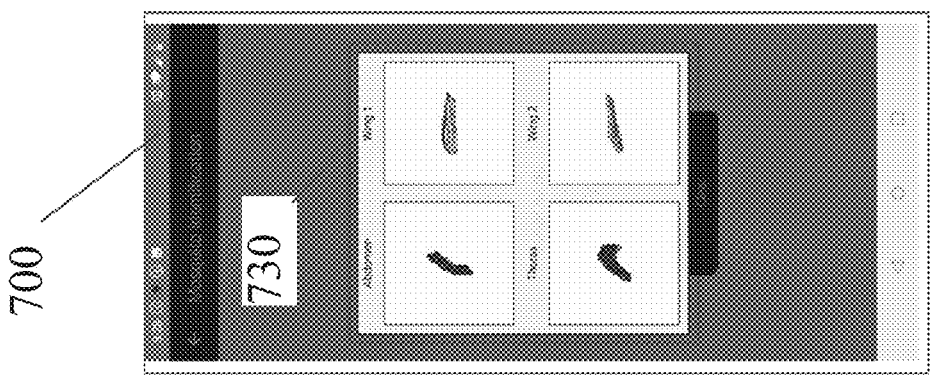
FIG. 7B is a fifth screen shot of a software application ("app") display using in conjunction with the systems and methods disclosed herein.
Figure 7A:
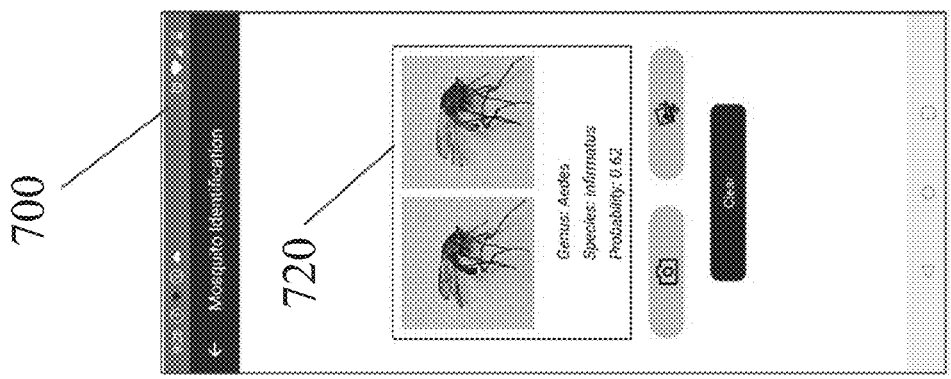
FIG. 7A is a fourth screen shot of a software application ("app") display using in conjunction with the systems and methods disclosed herein.

Non-limiting embodiments of this disclosure led to a development and design for a smartphone app in Android and iOS that when enables a user either to take an image of a mosquito, or choose one from the local storage of the phone. The app will classify the mosquito and also extract anatomical pixels corresponding to anatomies of interest—thorax, wing and abdomen, and even legs as shown in FIGS. 6 and 7.

This disclosure incorporates a framework based on a Mask Region-Based Convolutional Neural Network to automatically detect and separately extract pixels corresponding to anatomical components of mosquitoes, particularly the thorax, wings, abdomen and legs from images. In one non-limiting embodiment, a training dataset consisted of 1500 smartphone images of nine mosquito species trapped in Florida. In the proposed technique, the first step is to detect anatomical components within a mosquito image. Then, as discussed herein, the systems and methods of this disclosure localize and classify the extracted anatomical components, while simultaneously adding a branch in a neural network architecture to segment pixels containing only the anatomical components.

Figure 10:
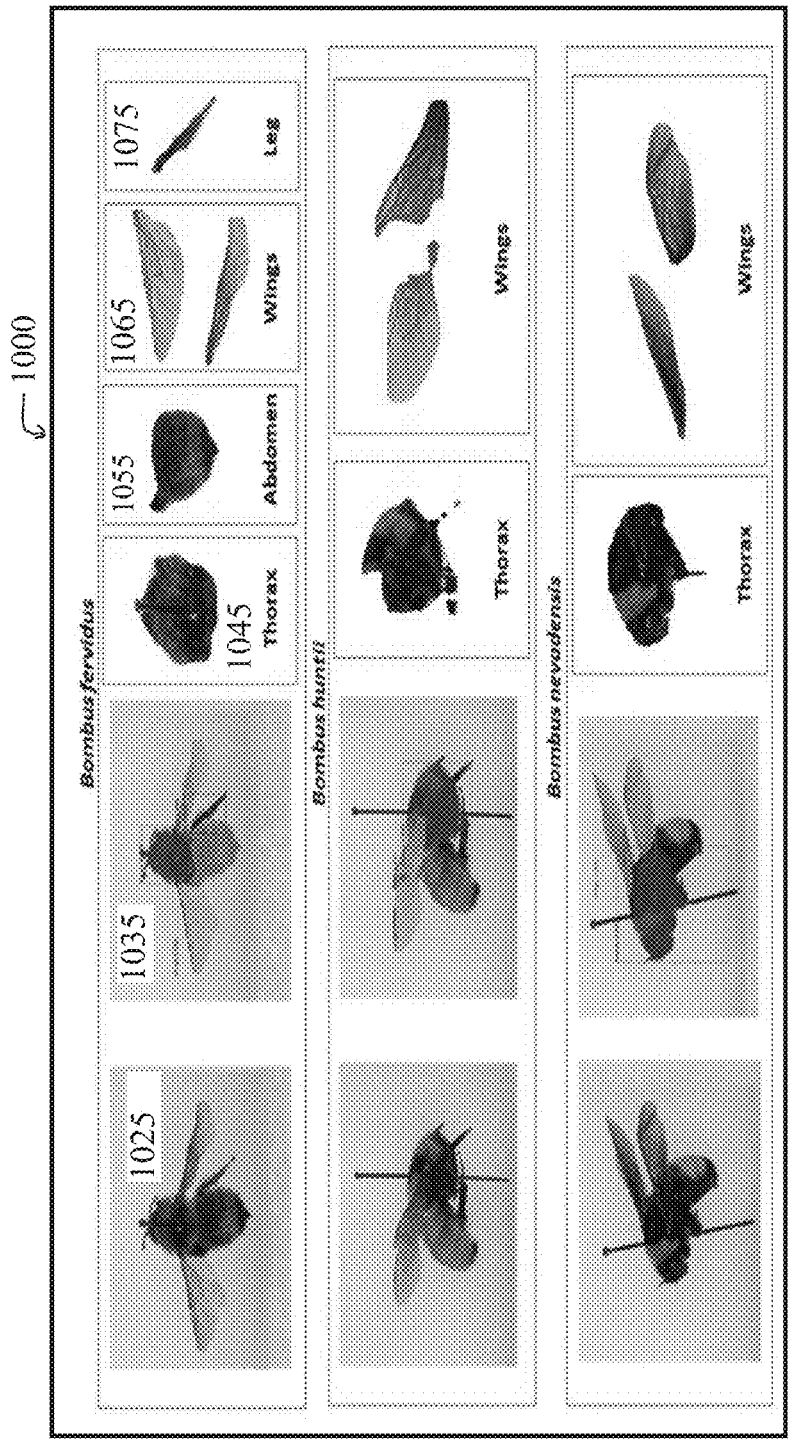
FIG. 10 is a schematic illustration of a training test for a convolutional neural network providing consolidated segmenting results of respective species of bumble bees with each species represented by an original image, a feature map illustrated with bounding boxes used by a respective convolutional network, and individually segmented anatomy parts separated out of the original image for display on a graphical processing unit of a computer used herein. The training test was used to illustrate that a convolutional neural network used to identify mosquito anatomy is adaptable to other species of pests.

To evaluate generality, this disclosure tests example architectures on bumblebee images as shown in FIG. 10, when the architectures have been trained only with mosquito images. The procedures of this disclosure have indicated favorable results.

Mosquito-borne diseases are still major public health concerns. Across the world today, surveillance of mosquito vectors is still a manual process. Steps include trap placement, collection of specimens, and identifying each specimen one by one under a microscope to determine the genus and species. Unfortunately, this process is cognitively demanding and takes hours to complete. This is due, in part, because mosquitoes that fall into traps include both vectors for disease as well as many that are not vectors. Recently, AI approaches are being designed to automate classification of mosquitoes. Works like design machine learning models (Refs. 1-4) are based on hand-crafted features from image data that are generated from either smartphones or digital cameras. Two recent papers design deep neural network techniques (that do not need hand-crafted features) to classify mosquitoes from image data generated via smartphones (Refs. 5, 6). Other works process sounds of mosquito flight for classification, based on the notion that wing-beat frequencies are unique across mosquito species (Refs. 7-10).

In this disclosure, the work demonstrates novel applications for mosquito images when processed using AI techniques. The most descriptive anatomical components of mosquitoes are the thorax, abdomen, wings and legs, and this disclosure presents a technique that extracts just the anatomical pixels corresponding to these specific anatomical components from any mosquito image. The technique is based on Mask Region-based Convolutional Neural Network (Ref. 11).

This disclosure utilizes procedures of convolutional neural networks (CNNs), including feature maps 808 illustrated in FIG. 8. In CNN theory, a neural network 800 applies weighted filters 806 to images 802 for respective purposes. In a very simplistic sense, the filters 806 are weighted to extract very precise portions, called features, from the image 802. In some embodiments, the weights are designed from training scenarios looking for gradient changes denoting edges in certain parts of the image. The respective result of each filter and its weights, as applied to the image, is a feature map 808. While the feature maps 808 of FIG. 8 are shown as two dimensional schematic representations, this disclosure includes feature maps in which a CNN applies feature filters with layers of kernels that output multi-layer feature maps. In other words, the feature maps 808 may have respective layers of image data. The image data may be processed globally as a set or individually as respective layers that have had a convolutional neural network 806 applied thereto. A first step of this disclosure includes extracting respective feature maps 808 for anatomical features of interest, from a training dataset of 1500 smartphone images of 200 mosquito specimens spread across nine species trapped in Florida. The neural network 806 to extract feature maps 808 is ResNet-101 with a Feature Pyramid Network (Ref. 12) (an architecture that can handle images at multiple scales, and one well suited for our problem).

As shown in FIG. 8, the systems and methods herein include applying bounding boxes 817 that are tailored to mark the feature maps 808 for respective features of the image, such as respective anatomical portions of a mosquito's body in the examples of this disclosure. The bounding boxes 812, 817 are organized pursuant to a region proposal network 816 for each feature of interest. As noted above, the examples of the figures are not limiting, as the bounding boxes may take any shape, including but not limited to rectangular. In one non-limiting example, the bounding boxes 812, 817 are proposed as shown at Ref. 816 based upon computer driven systems learning from the training sets that gradient changes in the pixels of respective convolved image layers may correspond to a certain anatomical feature if the gradient occurs in a certain area of the convolved image layer. The systems and methods utilize regressive processes, loss theories, and feedback from one feature map to the next to make the bounding boxes more and more precise and more tailored to one feature of interest (e.g., a thorax, a leg, an abdomen, a wing for an insect). Suggested separations, or segmenting, of pixels correspond to these features of interest.

In certain non-limiting embodiments, the process of honing in the bounding boxes 812, 817 for respective sets of anatomical pixels making up a body part is paired with an alignment process 814 that ensures that the output of the region proposal network 816 still matches outlines set forth in the original feature maps 808. Once this alignment is complete, and as shown in the non-limiting example of FIG. 8, the systems and methods disclosed herein are subject to masking operations, or pixel extraction, in a second convolutional neural network 818. The second convolutional neural network provides segmented images 820 in which certain examples result in anatomical pixels corresponding to a thorax, abdomen, wing, and leg of an insect. The output of the bounding boxes 812 applied by the region proposal network 816 is also fed to fully connected neural network layers 822. It is notable that the second convolutional neural network 818 utilizes convolutional layers that are filtered so that each "neuron" or matrix index within a data layer subject to a convolution are separately calculated and more sparse. The fully connected layers 822 track each prior layer more closely and are more data rich. The last fully connected layer is transmitted to both a classifier 824 and a boundary box regressor 826. The fully connected layers 822 are actually tied to each other layer by layer, neuron by neuron as shown by the arrows. The final fully connected layer 834 is the output layer and includes all data for all layers. In separate parallel operations, a boundary box regressor 826 and a classification processor 824 are applied to each layer of the first convolutional neural network 806 and/or the second convolutional neural network 818. The bounding box regressor 826 utilizes error function analyses to regressively tighten the bounding boxes 812 more accurately around a respective feature of interest. This kind of feedback loop 850 ensures that the bounding boxes 812, 817 of the region proposal network 816 provide convolved image layers that are distinct for each feature sought by the feature maps 808. The classifier 824 provides automated computerized processes to identify and label respective sets 828 of anatomical pixels identifying each anatomical part of the subject insect from the original image 802.

Figure 11:
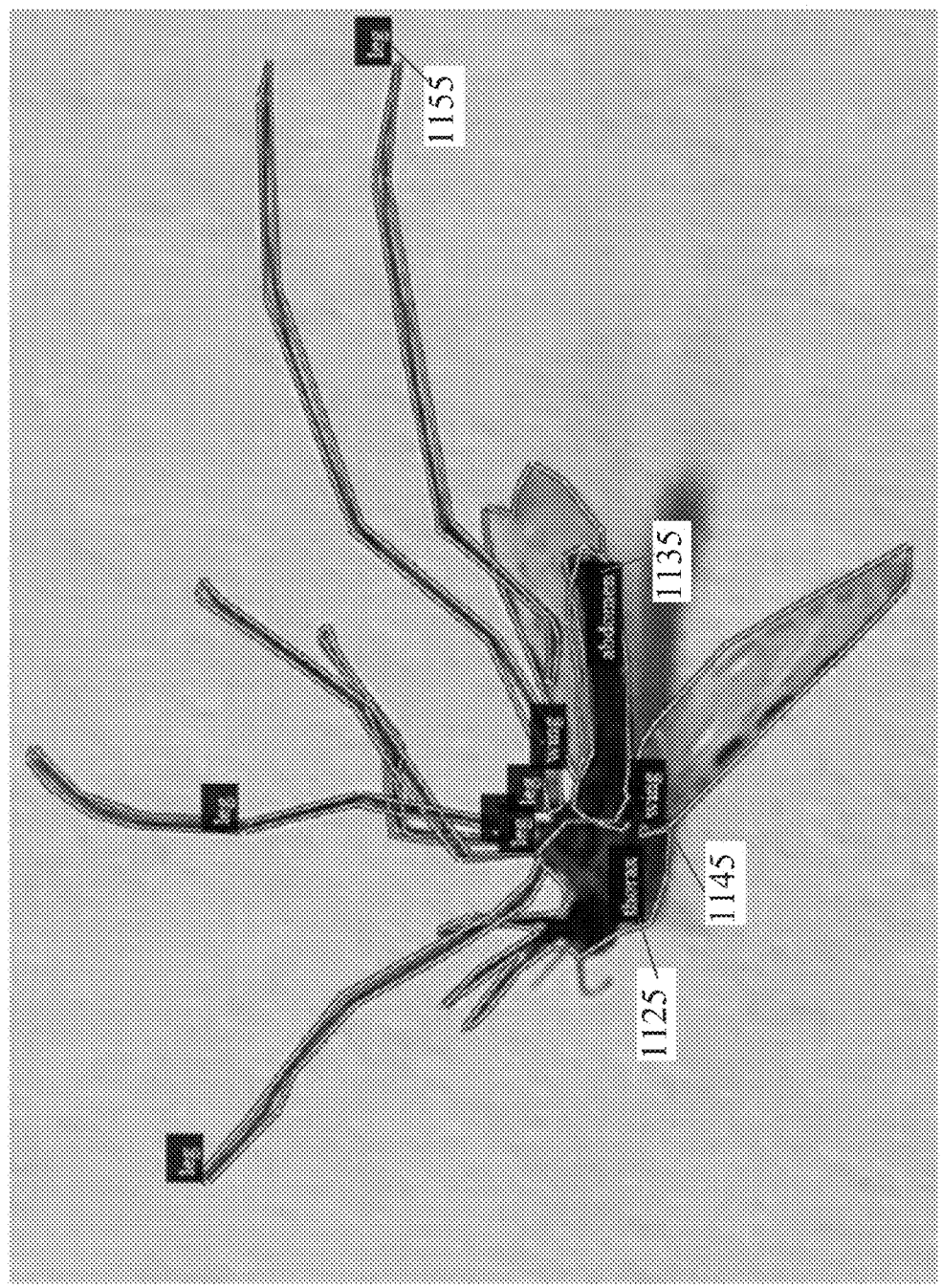
FIG. 11 is a segmented image of a mosquito in which components of the mosquito anatomy are identified as foreground pixels and filtered out by a convolutional neural network of this disclosure.

Subsequently, this disclosure sets forth steps to detect and localize anatomical components only (denoted as foreground) in the images in the form of rectangular anchors as illustrated in FIG. 2. The term anchors is a broader term for the above described "bounding boxes" 812, 817. The anchors, therefore, may take any shape and the rectangular bounding boxes 812, 817 are non-limiting examples of anchors. Once the foreground is detected, the next step is to segment the foreground pixels (e.g., FIG. 4, Refs. 410, 420, 430, 440) from the background pixels 470 by adding a branch to mask (i.e., "extract pixels of") each component present in the foreground. This extra branch is shown in FIG. 8 as the second convolutional neural network 818 that is done in parallel with two other branches 824, 826 to classify the extracted rectangular anchors and to tighten them to improve accuracy via the feedback loop 850. FIG. 11 shows how foreground pixels corresponding to a thorax 1125, an abdomen 1135, a wing 1145, and a leg 1155 are extracted and may be reassembled into an image as shown with literal identifier labels superimposed thereon.

Evaluation of the technique reveals favorable results. As shown in FIG. 4, one can see that anatomical pixels corresponding to the thorax, wings, abdomen and legs are extracted with high precision (i.e., very low false positives). For legs though, in some non-limiting embodiments false negatives are higher than others, since the number of background pixels overwhelm the number of leg pixels in the image. Nevertheless, one can see that enough descriptive features within the leg of a mosquito are indeed extracted out, since mosquito legs are long, and the descriptive features, such as color bands, do repeat across the leg.

This disclosure explains that extracting images of mosquito anatomy has an impact towards (a) faster classification of mosquitoes in the wild; (b) new digital-based, larger-scale and low-cost training programs for taxonomists; (c) new and engaging tools to stimulate broader participation in citizen-science efforts and more. Also, to evaluate generality, this disclosure incorporates testing of an architecture trained on mosquito images with images of bumblebees (which are important pollinators).

Overall, results show excellent accuracy in extracting the wings, and to a certain extent, the thorax, hence demonstrating the generality of the technique for many classes of insects. Training has enabled a Mask Region-Based Convolutional Neural Network (Mask R-CNN) to automatically detect and separately extract anatomical pixels corresponding to anatomical components of mosquitoes-thorax, wings, abdomen and legs from images. For this study, this disclosure illustrates 23 specimens of *Aedes aegypti* and *Aedes infirmatus*, and 22 specimens of *Aedes taeniorhynchus, Anopheles crucians, Anopheles quadrimaculatus, Anopheles stephensi, Culex coronator, Culex nigripalpus* and *Culex salinarius*. After imaging the specimens via multiple smartphones, the dataset was 1600 mosquito images. These were split into 1500 images for training the neural network, and 100 images for validation. Together, this dataset yielded 1600 images of thorax, 1600 images of abdomen, 3109 images of wings and 6223 images of legs. These data were used to train the architecture illustrated in FIG. 8 on an Nvidia graphic processing unit (GPU) cluster of four GeForce GTX TITAN X cards having 3,583 cores and 12 GB memory each. It took 48 hours to train and validate the architecture.

Figure 9A:
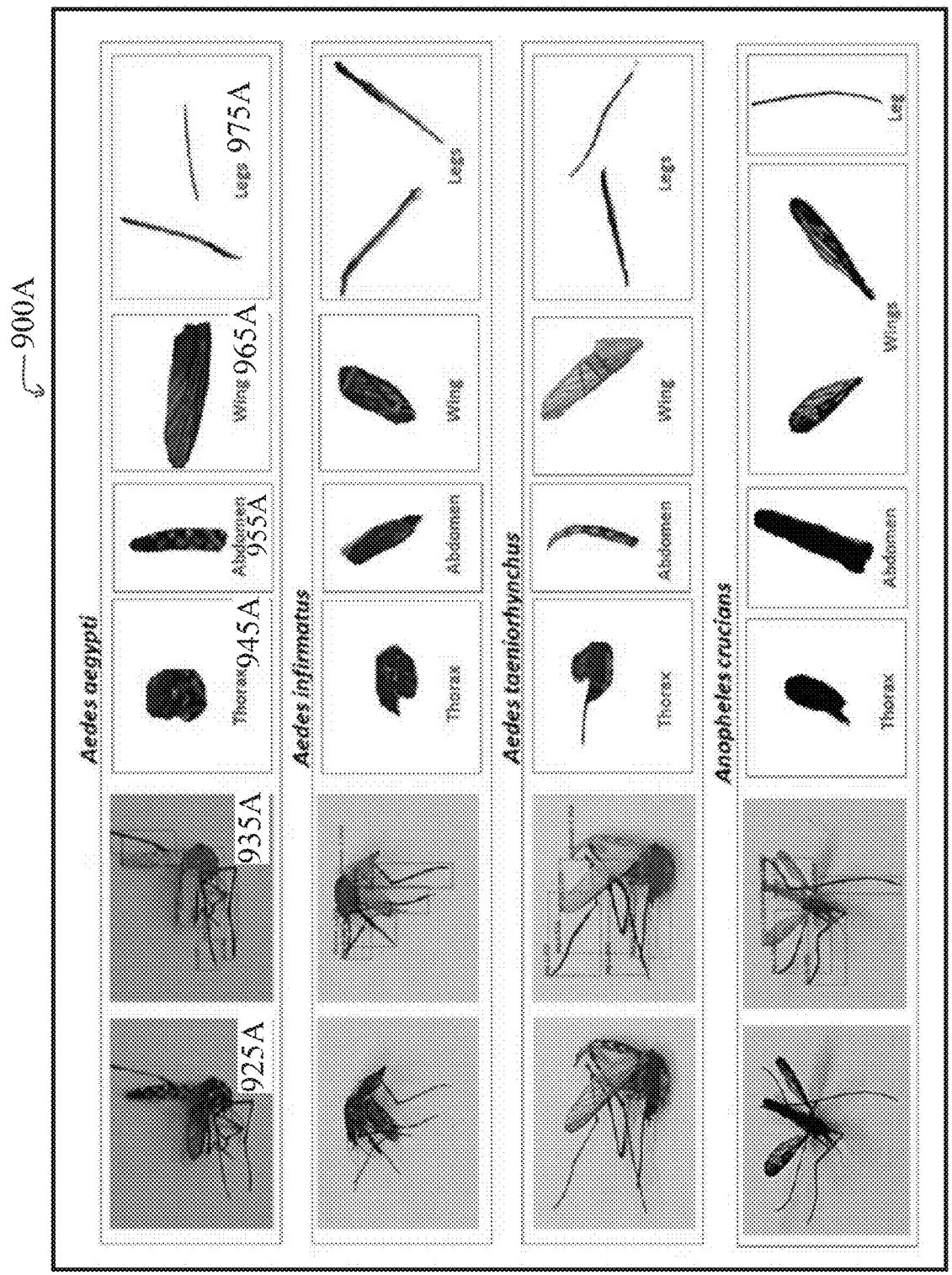
FIG. 9A is a schematic illustration of consolidated segmenting results of respective species of mosquitos with each species represented by an original image, a feature map illustrated with bounding boxes used by a respective convolutional network and individually segmented anatomy parts separated out of the original image for display on a graphical processing unit of a computer used herein.
Figure 9B:
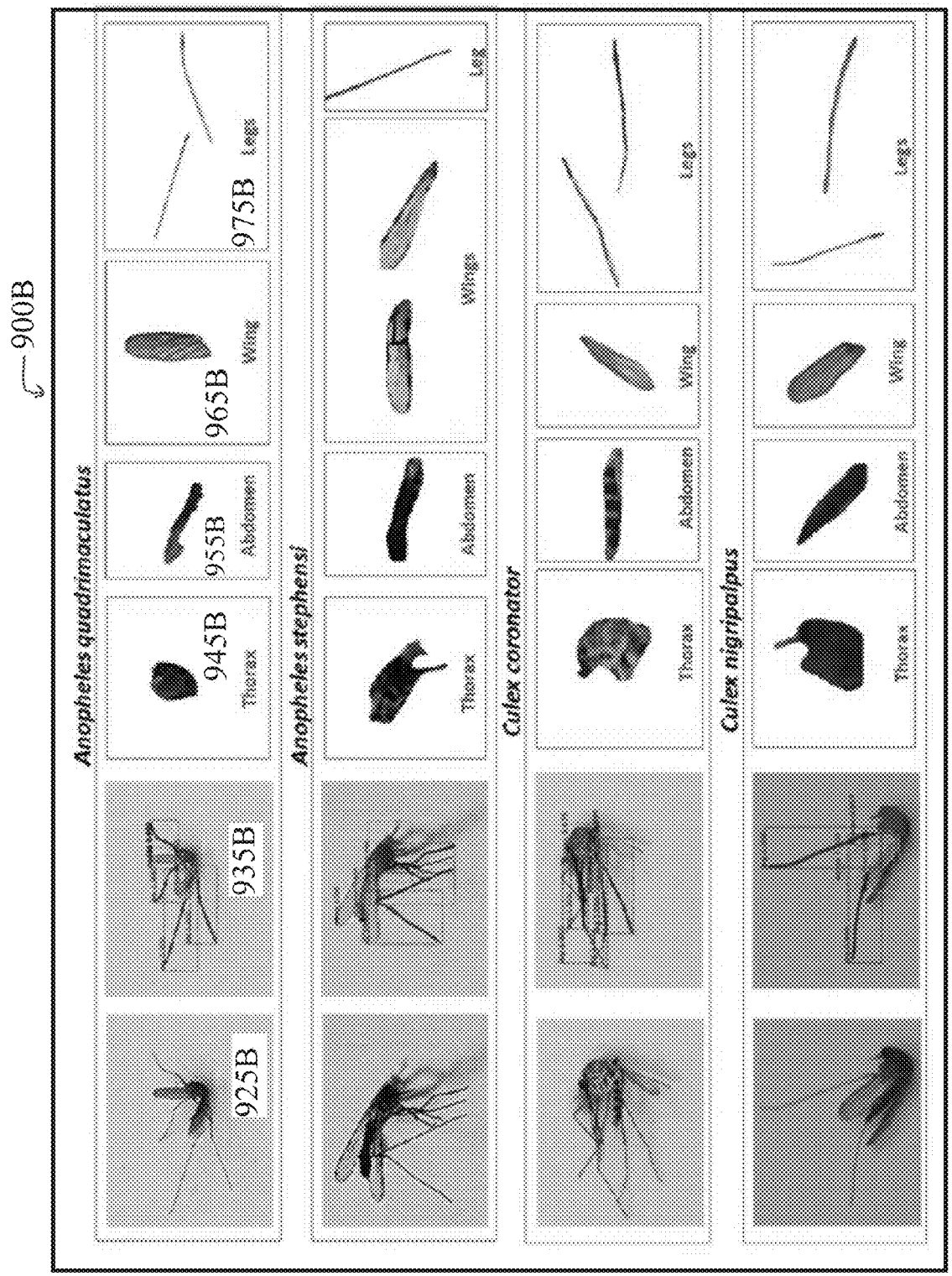
FIG. 9B is a schematic illustration of consolidated segmenting results of respective species of mosquitos with each species represented by an original image, a feature map illustrated with bounding boxes used by a respective convolutional network, and individually segmented anatomy parts separated out of the original image for display on a graphical processing unit of a computer used herein.
Figure 9C:
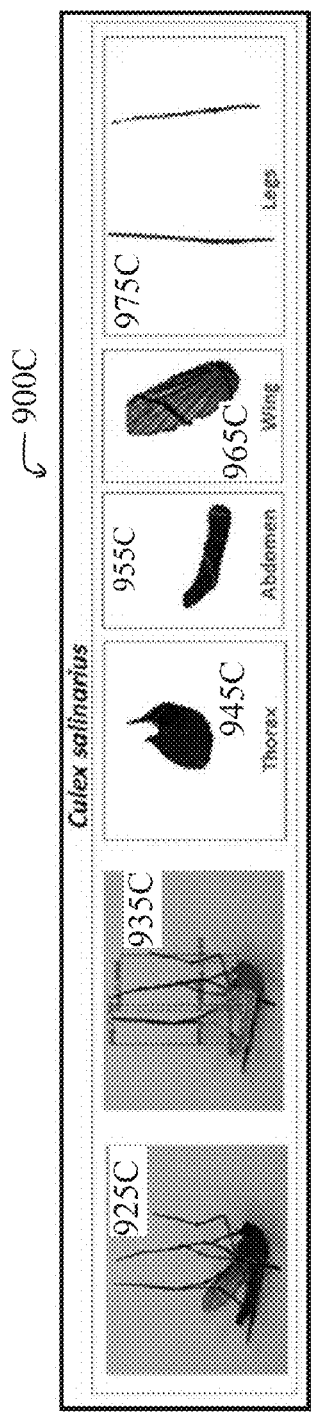
FIG. 9C is a schematic illustration of consolidated segmenting results of respective species of mosquitos with each species represented by an original image, a feature map illustrated with bounding boxes used by a respective convolutional network, and individually segmented anatomy parts separated out of the original image for display on a graphical processing unit of a computer used herein.

For testing in this disclosure, the research disclosed herein trapped and imaged (via smartphones) another set of 27 mosquitoes, i.e., three per species. The testing data set consisted of 27 images of thorax and abdomen, 48 images of wings and 105 images of legs. One embodiment presents results of a technique to extract anatomical components 945A-C, 955A-C, 965A-C, 975A-C of a mosquito in FIGS. 9A, 9B, 9C for one sample image 925A-C among the nine species in the testing dataset. These figures are representative of all other images tested in FIGS. 9A, 9B, 9C with each species, showing an original image 925A, 925B, 025C, respective output layers 935A, 935B, 935C of a convolutional neural network, and extracted anatomical pixels corresponding to a respective thorax portion 945A, 945B, 945C, abdomen portion 955A, 955B, 955C, wing portion 965A, 965B, 965C, and legs portion 975A, 975B, 975C. The anatomical components are indeed coming out clearly from image data 935A-C processed with bounding boxes utilized by a convolutional neural network.

Next, the systems and methods herein quantify performance for the entire dataset using four standard metrics: Precision, Recall, Intersection over Union (IoU) and Mean Average Precision (mAP). Precision is basically the fraction of relevant instances (here, pixels) among those instances (again, pixels) that are retrieved. Recall is the fraction of the relevant instances that were actually retrieved. IoU is a metric that assesses the ratio of areas of the intersection and the union among the predicted pixels and the ground truth. A higher IoU means more overlap between predictions and the ground-truth, and so better classification. To define a final metric, the Mean Average Precision (mAP), this disclosure defines another metric, Average precision (AP), which is the average of all the Precision values for a range of Recall (0 to 100 for our problem) at a certain preset IoU threshold and for a particular class among the four for our problem (i.e., wings, thorax, legs and abdomen). This metric essentially balances both Precision and Recall for a particular value of IoU for one class. Finally, the Mean Average Precision (mAP) is the average of AP values among all our four classes.

The Precision and Recall values for the validation and testing datasets are presented in Tables 1 and 2 respectively for various values of IoU. As shown, the performance metrics in the validation dataset during training match the metrics during testing (i.e., unseen images) and post training across all IoUs. This is convincing evidence that the architecture is robust and not overfitted.

Precision for all classes is high, which means that false positives are low. Recall is also high for the thorax, abdomen and wings, indicating low false negatives for these classes. However, Recall for legs class is relatively poor. It turns out that a non-trivial portion of the leg pixels are classified as the background in one non-limiting architecture. While this may seem a bit discouraging, in FIGS. 9A, 9B, 9C, a very good portion of the legs are still identified and extracted correctly by the disclosed architecture (due to the high Precision). As such, the goal of gleaning the morphological markers from all anatomical components is still enabled. Finally, the mean average precision is presented in Table 3 for all classes. The lower numbers in Table 3, are due to poorer performance for classifying legs, as compared to thorax, abdomen and wings.

TABLE 1

Precision and Recall for Different IoU Thresholds on Validation Set.

| Anatomy | IoU ratio = 0.30 | | IoU ratio = 0.50 | | IoU ratio = 0.70 | |
|---|---|---|---|---|---|---|
| | Precision (%) | Recall (%) | Precision (%) | Recall (%) | Precision (%) | Recall (%) |
| Thorax | 94.57 | 95.15 | 99.32 | 89.69 | 99.09 | 66.67 |
| Abdonmen | 95.27 | 90.96 | 96.37 | 85.80 | 99.17 | 77.41 |
| Wing | 98.17 | 91.49 | 98.53 | 85.50 | 97.82 | 76.59 |
| Leg | 99.35 | 37.85 | 100 | 25.60 | 100 | 21.50 |

TABLE 2

Precision and Recall for Different IoU Thresholds on Testing Set.

| Anatomy | IoU ratio = 0.30 | | IoU ratio = 0.50 | | IoU ratio = 0.70 | |
|---|---|---|---|---|---|---|
| | Precision (%) | Recall (%) | Precision (%) | Recall (%) | Precision (%) | Recall (%) |
| Thorax | 96 | 96 | 100 | 87.50 | 100 | 52 |
| Abdonmen | 95.23 | 95.23 | 100 | 85.71 | 100 | 61.90 |
| Wing | 100 | 88.36 | 100 | 81.81 | 100 | 61.36 |
| Leg | 95.46 | 35.76 | 100 | 21.40 | 100 | 19.25 |

TABLE 3 mAP scores far masking.

| IoU ratio | Validation Set (%) | Testing Set (%) |
|---|---|---|
| 0.30 | 62.50 | 53.49 |
| 0.50 | 60 | 52.38 |
| 0.70 | 51 | 41.20 |

This disclosure also includes results from a small experiment with bumblebee images of FIG. 10. The information herein subsequently verified how an AI architecture that was trained only with mosquito images, performs, when tested with images 1025 of bumblebees after the images 1025 have been subject to processing by a neural network as disclosed herein, utilizing bounding box images 1035 to segment the bee anatomy. Bumblebees (Genus: *Bombus*) are important pollinators, and detecting them in nature is vital. FIG. 10 presents example results for one representative image among three species of bumblebees, although the results are only representative of more than 100 bumblebee images we tested. The image source for bumblebees was Smithsonian National Museum of Natural History in Washington, D.C. Images can be found at Ref. 13. As shown in FIG. 10, one non-limiting technique in accordance with this disclosure is robust in detecting and extracting wing pixels 1065. While the thorax pixels 1045 are mostly extracted correctly, the ability to extract out the abdomen pixels 1055 and leg pixels 1075 is relatively poor. With these results, a confidence level is quite high for using the disclosed architecture to extract wings of many insects. With appropriate ground-truth data, only minimal tweaks to architecture will be needed to ensure robust extraction of all anatomical components for a wide range of insects.

This disclosure includes the following discussions on the significance of contributions in this paper.

(a) Faster classification of trapped mosquitoes. Across the world, where mosquito-borne diseases are problematic, it is standard practice to lay traps, and then come back the next day to pick up specimens, freeze them and bring them to a facility, where expert taxonomists identify each specimen one-by-one under a microscope to classify the genus and species. This process takes hours each day, and is cognitively demanding. During rainy seasons and outbreaks, hundreds of mosquitoes get trapped, and it may take an entire day to process a batch from one trap alone. Based on technologies illustrated herein, mobile cameras can assist in taking high quality pictures of trapped mosquito specimens, and the extracted anatomies can be used for classification by experts by looking at a digital monitor rather than peering through a microscope. This will result in lower cognitive stress for taxonomists and also speed up surveillance efforts. In one non-limiting embodiment, Table 4 presents details on morphological markers that taxonomists look for to identify mosquitoes used in this study and discussed further at Ref. 14.

TABLE 4

Anatomical components and markers aiding mosquito classification Refs. 6-30.

| Species | Thorax | Abdomen | Wing | Leg |
|---|---|---|---|---|
| *Aedes Aegypti* | Dark with while lyre shaped pattern and patches of white scales | Dark with narrow white basal bands | Dark | Dark with white basal bands |
| *Aedes infirmatus* | Brown with patches of white scales | Dark with basal triangular patches of white scales | Dark | Dark |
| *Aedes Taeniorhynchus* | Dark with patches of white scales | Dark with white basal bands | Dark | Dark with white basal bands |
| *Anopheles Crucians* | Gray-Black | Dark | Light and dark scales; dark costa; white wing tip; 3 dark spots on sixth vein | Dark with pale knee spots |
| *Anopheles Quadrimaculatus* | Gray-Black | Dark | Light and dark scales; 4 distinct darker spots | Dark with pale knee spots |

TABLE 4-continued

Anatomical components and markers
aiding mosquito classification Refs. 6-30.

| Species | Thorax | Abdomen | Wing | Leg |
|---|---|---|---|---|
| *Anopheles Stephensi* | Broad bands of white scales | | Four dark spots on costa extending to first vein | Speckling; narrow white band on fifth tarsomere |
| *Culex Coronator* | Dark with white scales on the apical third segments | Sterna without dark triangles; mostly pale scales | | Distinct basal and apical bands on hind tarsomeres |
| *Culex Nigripalpus* | Brown copper color; white scales | Dark with lateral white patches | Dark | Dark |
| *Culex Salinarius* | Copper; sometimes distinctly red; patches of white scales | Dark with golden basal bands; golden color on seventh segment | Dark | Dark |

(b) AI and Cloud Support Education for Training Next-generation Taxonomists. The process of training taxonomists today across the world consists of very few training institutes, which store a few frozen samples of local and non-local mosquitoes. Trainees interested in these programs are not only professional taxonomists, but also hobbyists. The associated costs to store frozen mosquitoes are not trivial (especially in low economy countries), which severely limit entry into these programs, and also make these programs expensive to enroll. With technologies like those of this disclosure, digital support for trainees is enabled. Benefits include, but are not limited to, potential for remote education, reduced operational costs of institutes, reduced costs of enrollment, and opportunities to enroll more trainees. These benefits when enabled in practice will have positive impact to taxonomy, entomology, public health and more.

(c). Digital Preservation of Insect Anatomies under Extinction Threats. Recently, there are concerning reports that insects are disappearing at rapid rates. Digital preservation of their morphologies could itself aid preservation, as more and more citizen-scientists explore nature and share data to identify species under immediate threat. Preservation of insect images may also help educate future scientists across a diverse spectrum.

Image Processing Examples

Generation of Image Dataset and Preprocessing. In Summer 2019, research included partnering with Hillsborough county mosquito control district in Florida, USA to lay outdoor mosquito traps over multiple days. Each morning after laying traps, methods of this disclosure included collecting all captured mosquitoes, freezing them in a portable container and taking them to the county lab, where taxonomists identified them. This study utilized 23 specimens of *Aedes aegypti* and *Aedes infirmatus*, and 22 specimens of *Aedes taeniorhynchus, Anopheles crucians, Anopheles quadrimaculatus, Anopheles stephensi, Culex coronator, Culex nigripalpus* and *Culex salinarius*. It is notable to point out that specimens of eight species were trapped in the wild. The *An. stephensi* specimens alone were lab-raised whose ancestors were originally trapped in India.

Each specimen was then placed on a plain flat surface, and then imaged using a smartphone (among iPhone 8, 8 Plus, and Samsung Galaxy S8, S10) in normal indoor light conditions. To take images, the smartphone was attached to a movable platform 4 to 5 inches above the mosquito specimen, and three photos at different angles were taken. One directly above, and two at 45 degree angles to the specimen opposite from each other. As a result of these procedures, a total of 600 images were generated. Then, 500 of these images were preprocessed to generate the training dataset, and the remaining 100 images were separated out for validation. For preprocessing, the images were scaled down to 1024×1024 pixels for faster training (which did not lower accuracy). The images were augmented by adding Gaussian blur and randomly flipping them from left to right. These methods are standard in image processing, which better account for variances during run-time execution. After this procedure, the training dataset increased to 1500 images. Note here that all mosquitoes used in this study are vectors for disease and illness. Among these, *Aedes aegypti* is particularly dangerous, since it spreads Zika fever, dengue, chikungunya and yellow fever. This mosquito is also globally distributed now.

Deep Neural Network Framework based on Mask R-CNN. To address the goal of extracting anatomical components from a mosquito image, a straightforward approach is to try a mixture of Gaussian models to remove background from the image. See Refs 1, 15. But this will only remove the background, without being able to extract anatomical components in the foreground separately. There are other recent approaches in the realm also. One technique is U-Net, see Ref. 16, wherein semantic segmentation based on deep neural networks is proposed. However, this technique does not lend itself to instance segmentation (i.e., segmenting and labeling of pixels across multiple classes). Multi-task Network Cascade, see Ref. 17 (MNC), is an instance segmentation technique, but it is prone to information loss, and is not suitable for images as complex as mosquitoes with multiple anatomical components.

Fully Convolutional Instance-Aware Semantic Segmentation, see Ref. 18 (FCIS), is another instance segmentation technique, but it is prone to systematic errors on overlapping instances and creates spurious edges, which are not desirable. See DeepMask at Ref. 19, developed by Facebook, extracts masks (i.e., pixels) and then uses Fast R-CNN (Ref. 20) technique to classify the pixels within the mask. This technique though is slow as it does not enable segmentation and classification in parallel. Furthermore, it uses selective search to find out regions of interest, which further adds to delays in training and inference.

In one aspect, this disclosure leverages Mask R-CNN, see Ref. 11, which is a neural network architecture for extracting masks (i.e. pixels) corresponding to objects of interest within an image which eliminates selective search, and also uses Regional Proposal Network (RPN) of Ref. 21 to learn correct regions of interest. This approach is best suited for quicker training and inference. Apart from that, it uses superior alignment techniques for feature maps, which helps prevent information loss. The basic architecture is shown in FIG. 8. Adapting it for the issues of this disclosure requires a series of steps presented below.

1. Annotation for Ground-Truth. First, research herein includes manually annotating training and validation images using the VGG Image Annotator (VIA) tool as set forth in Ref. 22. To do so, this disclosure shows manually (and carefully) emplacing bounding polygons around each anatomical component in our training and validation images. The pixels within the polygons and associated labels (i.e., thorax, abdomen, wing or leg) serve as ground truth. One sample annotated image is shown in FIG. 4.

2. Generate Feature Maps using CNN. Then, the systems and methods disclosed herein use semantically rich features in the training image dataset to recognize the complex anatomical components of the mosquito as shown, for example, in the image 802 of FIG. 8. To do so, one non-limiting neural network architecture 800 is a combination of the popular Res-Net101 architecture 806 with Feature Pyramid Networks (FPN) as shown in Ref. 12. Very briefly, ResNet-101 (Ref. 23) is a convolutional neural network (CNN) with residual connections, and was specifically designed to remove vanishing gradients at later layers during training. It is relatively simple with 345 layers. Addition of a feature pyramid network to ResNet was attempted in another study, where the motivation was to leverage the naturally pyramidal shape of CNNs, and to also create a subsequent feature pyramid network that combines low resolution semantically strong features with high resolution semantically weak features using a top-down pathway and lateral connections. Ref. 12.

This resulting architecture is well suited to learn from images at different scales from only minimal input image scales. Ensuring scale-invariant learning is important for this disclosure, since mosquito images can be generated at different scales during run-time, due to diversity in camera hardware and human induced variations. The output of the first convolutional neural network 806 is a set of respective feature maps 808 that isolate anatomical pixels for respective anatomical body parts of the subject insect in the image 802.

3. Emplacing anchors on anatomical components in the image. This step leverages the notion of Regional Proposal Network (RPN) 816, as set forth in Ref. 21, and results from the previous two steps, to design a simpler CNN that will learn feature maps corresponding to ground-truth tested anatomical components in the training images. One end goal is to emplace anchors (which, in non-limiting examples, are bounding boxes 812) that enclose the detected anatomical components of interest in the image.

4. Classification and pixel-level extraction. Finally, this disclosure aligns the feature maps of the anchors (i.e., region of interest) learned from the above step into fixed sized feature maps. The alignment step 824 provides the fixed sized feature maps as inputs to three branches of the architecture 800 to:

(a) label the anchors with the anatomical component as illustrated in FIG. 3;

(b) extract only the pixels within the anchors that represents an anatomical component as illustrated in FIGS. 5A-5D; and (c) tighten the anchors for improved accuracy as shown at Ref. 812 in FIG. 8. All three steps are done in parallel.

5. Loss functions. For issues considered in this disclosure, one non-limiting scenario recalls that there are three specific sub-problems: labeling the anchors as thorax, abdomen, wings or leg; masking the corresponding anatomical pixels within each anchor; and a regressor to tighten anchors. Embodiments of this disclosure incorporate loss functions used for these three sub-problems. Loss functions are a critical component during training and validation of deep neural networks to improve learning accuracy and avoid overfitting.

6. Labeling (or classification) loss. For classifying the anchors, non-limiting embodiments of this disclosure utilize the Categorical Cross Entropy loss function, and it worked well. For a single anchor j, the loss is given by an expression "where p is the model estimated probability for the ground truth class of the anchor."

7. Masking loss. Masking is a challenging endeavor in image processing, considering the complexity in a neural network learning to detect only pixels corresponding to anatomical components in an anchor. Non-limiting experiments used in this research used the simple Binary Cross Entropy loss function. With this loss function, good accuracy was shown for pixels corresponding to thorax, wings and abdomen. But, many pixels corresponding to legs were mis-classified as background. This is because of class imbalance highlighted in FIG. 2 wherein we see significantly larger number of background pixels, compared to number of foreground pixels for anchors (colored blue) emplaced around legs. This imbalance leads to poor learning for legs, because the binary class entropy loss function is biased towards the (much more, and easier to classify) background pixels.

Another investigation utilized another more recently developed loss function called focal loss, discussed at Ref. 24, which lowers the effect of well classified samples on the loss, and rather places more emphasis on the harder samples. This loss function hence prevents more commonly occurring background pixels from overwhelming the not so commonly occurring foreground pixels during learning, hence overcoming class imbalance problems. The focal loss for a pixel i is represented as:

where p is the model estimated probability for the ground truth class, and gamma—γ—is a tunable parameter, optionally set as 2 in one example model. With these definitions, it is easy to see that when a pixel is mis-classified and p→0, then the modulating factor $(1-p)^\gamma$ tends to 1 and the loss (log(p)) is not affected. However, when a pixel is classified correctly and when p→1, the loss is down-weighted. In this manner, priority during training is emphasized more on the hard negative classifications, hence yielding superior classification performance in the case of unbalanced datasets. Utilizing the focal loss gave superior classification results for all anatomical components.

8. Regressor loss. To tighten the anchors and hence improve masking accuracy, the loss function used in one non-limiting example is based on the summation of Smooth L1 functions computed across anchor, ground truth and predicted anchors.

In one example algorithm for Let (x, y) denote the top-left coordinate of a predicted anchor. Let xa and x* denote the same for anchors generated by the RPN, and the manually generated ground-truth. The notations are the same for the y coordinate, width w and height h of an anchor. The procedure may include defining several terms first, following which the loss function Lreg used in one non-limiting example architecture is presented.

$$t_x^* = \frac{x^* - x_a}{w_a}, t_x^* = \frac{y^* - y_a}{h_a}, t_w^* = \log\left(\frac{w^*}{w_a}\right), t_h^* = \log\left(\frac{h^*}{h_a}\right), \quad (3)$$

$$t_x = \frac{x - x_a}{w_a}, t_x^* = \frac{y - y_a}{h_a}, t_w = \log\left(\frac{w}{w_a}\right), t_h = \log\left(\frac{h}{h_a}\right),$$

$$smooth_{L_1} = \begin{cases} 0.5x^2 & \text{if } |x| < 1 \\ |x| - 0.5, & \text{otherwise} \end{cases} \text{ and}$$

$$L_{reg}(t_i, t_i^*) \sum_{i \in x, y, w, h} smooth_{L_1}(t_i^* - t_i).$$

Hyperparameters. For convenience, Table 5 lists values of critical hyperparameters in our finalized architecture.

TABLE 5

| Values of critical hyperparameters in our architecture | |
|---|---|
| Hyperparameter | Value |
| Number of layers | 394 |
| Learning rate | 1e−3 for 1-100 epochs |
|  | 5e−4 for 101-200 epochs |
|  | 1e−5 for 201-400 epochs |
|  | 1e−6 for 401-500 epochs |
| Optimizer | SGD |
| Momentum | 0.9 |
| Weight decay | 0.001 |
| Number of epochs | 500 |

Accordingly, this disclosure presents a system to design state of the art artificial intelligence (AI) techniques, namely techniques based on Mask Region-based Convolutional Neural Networks to extract anatomical components of mosquitoes from digital images and archive them permanently based on genus, species and other taxonomies. This disclosure indicates that the systems and methods of this disclosure currently have generated close to 30,000 digital images of mosquitoes (taken via smartphones) that are tagged based on genus and species type. Once anatomies of interest are extracted, this disclosure utilizes AI techniques to design a model that can recognize genus and species types of mosquitoes. Should the system be popular among citizens and experts, and users recruit entomologists, there are opportunities to globally scale up the effort to include many more mosquito types and improve our models over time.

One non-limiting proposition of this disclosure is the ability to bypass humans that peer through a microscope currently for classification, and instead use digital cameras and the proposed technique for automated classification of genus and species type. A secondary value proposition is the ability of the disclosed system, with large scale citizen and expert generated imagery with tagging, to start digitizing anatomies of mosquitoes across the globe. This database could prove invaluable for training, and global information sharing in the context of mosquito, and especially vector surveillance.

Commercial Examples

There are companies with bases in the US that are already exploring the space of smart insect traps. Two companies are presented below.

1. BG-Counter—https://www.bg-sentinel.com/en/bg-counter.html—Hillsborough county in Florida USA uses these traps. These traps can detect if an insect falling in is a mosquito or not. Then, through a cloud service, collection reports are periodically sent to county personnel. Hillsborough county personnel showed me how the traps work and the dashboard they see for visualization. County personnel also told me that BG-counter does plan to invest in techniques for genus and species identification in future models. Improving this kind of current merchandise is timely.

2. TrapView—https://www.trapview.com/en/—This is a trap for pests that captures pests, takes their picture using a built-in camera, sends the pictures to the cloud. In the cloud, algorithms are designed to identify the type of pest. Information is fed back to farmers who can then plan accordingly to treat their crops. However, anatomies are not extracted in this product. FIG. 1 illustrates how they display results to farmers.

Both these companies and others like them can be potential partners for using the systems and methods of this disclosure along with a taxonomist with experience in insect identification.

Example—Extraction of Anatomies

The disclosed approach for one example procedure is based on the notion of Mask R-CNN [32] leveraging by which one segment pixels containing each anatomical component of interest by adding a branch for predicting an object mask (i.e., pixel-wise segmentation) in parallel with the existing branch for recognizing the bounding box (see FIG. 4 below).

In this approach, several critical steps (each of which is challenging) need to be executed. First, one must train the model using pretrained convolutional neural networks to generate proposals about the regions where there might be an object within the image. As discussed above, one non-limiting example of a convolutional neural network used herein is ResNet101, used as a backbone convolutional model. In one non-limiting example, initialization of the model was done using the pretrained MS COCO [34] dataset weights. ResNet [33] has a very deep network and introduces a residual connection to get the input from the previous layer to the next layer. The residual connection helps in solving gradient vanishing problem. MS COCO dataset is large scale object detection dataset. It contains 1.5 million object instances, and 80 object categories. The next step is to design an object detector network that does three tasks: classifying the boxes with respective anatomies, tightening the boxes, and generating a mask (i.e., pixel-wise segmentation) of each anatomical component. In constructing the architecture of the object detector network, this disclosures uses per-pixel sigmoid as an example, along with binary cross-entropy loss function (to identify the k anatomical components) and rigorously train them.

Note that generating training datasets here are not easy, since a mask is required to be created for each anatomical component in our dataset. To start the training, users first annotated 571 mosquito images, using VGG Image annotator tool which is itself a very tedious job (annotated images are shown in FIG. 3). Out of 571 images, 404 are the training images and 167 are validation images. Then, the methods iterate the model to optimize weights/hyper-parameters. This disclosure shows that the methods have optimized hyper-parameters like base feature extractor model, learning rate, momentum, optimizer, steps per epoch, validation steps and number of epochs, details are in below Table 6.

TABLE 6

| Parameter | Value |
| --- | --- |
| Optimizer | Adam |
| Momentum | 0.9 |
| Learning rate | 1e-4 for first 50 epochs, 1e-5 for next 50 and 1e-6 for next 100 epochs |
| Batch Size | 2 |
| Steps per epoch | 202 |
| Validation steps | 84 |
| Number of epochs | 200 |

Result:

The metrics to measure the accuracy of mask R-CNN algorithm is mAP (Mean Average Precision). It was calculated by taking the mean of all the average precision across all classes over all IoU thresholds, and is 0.833. The metric IoU measures the intersection of ratio of pixels that belong to the ground-truth of the object in the bounding box and the union of the predicted and the ground truth ratio of pixels in the box. In our design, the IoU threshold was set as 0.75.

FIGS. 6A, 6B, 6C and 7A, 7B, 7C show an example design of a smartphone 600, 700 application in Android and iOS that enables a user to either take an image 620, 720 of a mosquito, or choose one from the local storage of the phone. The app will classify the mosquito and also extract anatomies of interest—thorax, wing and abdomen and legs for display in respective anatomical images 620, 720, 630, 730, 640, 740. All images generated are archived in the cloud.

Example—Classification of Genus and Species Type Based on Extracted Anatomies

This disclosure explains a design for a neural network based architecture to identify genus and species type of mosquitoes from the whole image body. The network architectures are presented below. The results have achieved close to 80% accuracy in classifying various (currently nine mosquito species), and close to 99% accuracy in identifying a very deadly mosquito—*Aedes aegypti*—that spreads Zika fever, dengue, chikungunya, and yellow fever—and one is prevalent all over the world.

TABLE 7

Genus architecture

| Layer | Size In | Size Out |
| --- | --- | --- |
| block17_10_conv (Layer 433 in IRV2) | (None, 17, 17, 384) | (None, 17, 17, 1088) |
| GlobalAverage Pooling2D | (None, 17, 17, 1088) | (1, 1088) |
| dense_1 | (1, 1088) | 512 |
| dense_2 | 512 | 256 |
| dense_3 | 256 | 128 |
| dense_4 | 128 | 75 |
| concat_1 | (dense_1, dense_2, dense_3, dense_4) | 1152 |
| softmax | 1152 | 3 |

TABLE 8

Species Architecture

| Layer | Size In | Size Out |
| --- | --- | --- |
| block17_10_conv (Layer 433 in IRV2) | (None, 17, 17, 384) | (None, 17, 17, 1088) |
| GlobalAverage Pooling2D | (None, 17, 17, 1088) | (1, 1088) |
| dense_1 | (1, 1088) | 512 |
| dense_2 | 512 | 256 |
| dense_3 | 256 | 128 |
| dense_4 | 128 | 75 |
| concat_1 | (dense_1, dense_2, dense_3, dense_4) | 1152 |
| softmax | 1152 | 9 |

In another example, users are extending the above architectures to classify based on anatomies also. This is part of on-going work, but the network architectures for each anatomy—thorax, abdomen, wings and leg will be very similar to the above architectures.

Embodiments of this disclosure include non-limiting combinations of the above described work. Accordingly, in one example, a system 800 for identifying a genus and species of an insect includes an imaging device 600, 700 configured to generate images of the insect. The imaging device may be a smart phone or other mobile computer devices with camera functions. A computer processor 1202 is connected to memory 1204 storing computer implemented commands in software, and the memory receives the images (i.e., the computer processor, the memory, and the imaging device may be in data communication over a network or a local connection). The software implements a computerized method with respective images, beginning with applying a first convolutional neural network 806 to the respective images 802 to develop feature maps 808 directed to anatomical pixels 510, 520, 530, 540, e.g., in the respective images that correspond to a body part of the insect. By weighting filters in the first convolutional neural network, the system is set up to identify, within the respective images, the anatomical pixels as foreground pixels and remaining pixels as background pixels to be removed during segmenting operations.

Next, the system utilizes the processor or other computers to apply anchors 812, 817 to the feature maps 808, wherein the anchors identify portions of respective layers of image data in the feature maps that contain respective anatomical pixels for respective body parts. In other words, the feature maps may be multidimensional layers of image data, and the system can operate on individual layers of image data or multiple sets of layers of image data that have resulted from the first convolutional neural network 806. The anchors may take the form of any polygon that bounds a desired set of anatomical pixels within images, feature maps, or layers of image data. In one non-limiting example, the anchors are bounding boxes that are generated by the computer processor and shown on a graphical display unit as being within or superimposed on the images. The software further includes an alignment function 814 to align layers having anchors 812, 817 thereon with the original feature maps.

The system uses these anchors in generating a mask 818A that segments the respective anatomical pixels from the respective layers of image data. Generating the mask may include applying a second convolutional neural network 818B to the respective layers, wherein the second convolutional neural network segments the anatomical pixels according to a corresponding respective body part.

The mask allows for extracting fully connected layers 822 from the respective layers that have had the first convolutional neural network 806 applied thereto, and the system is further configured for applying the fully connected layers to a regressor network 826 and a classification network 824, wherein generating the mask for segmenting, applying the fully connected layers to a regressor network, and applying the fully connected layers to a classification network are parallel operations conducted by the software. In certain non-limiting embodiments generating the mask includes applying a second convolutional neural network to the respective layers, wherein the second convolutional neural network segments the anatomical pixels according to a corresponding respective body part.

In some non-limiting embodiments, the parallel operations occur simultaneously.

The regressor network 826 is a software program implemented by a computer to calculate error values regarding iterative positions for the anchors in the respective layers. The system uses the error values in a feedback loop 850 to tighten the anchors 812, 817 around anatomical pixels corresponding to a respective body part. The regressor network and associated computer-implemented software calculates error values regarding iterative positions for the anchors in the respective layers and wherein the error values are derived from a binary cross entropy loss function or a focal loss function.

The anchors 812, 817 may be bounding boxes, or any other shape, originating from a region proposal network 816 receiving the feature maps 808 as respective layers of image data, and the feedback loop 850 transmits error values from the regressor network 826 to the region proposal network 817 to tighten the boxes onto appropriate pixels corresponding to the respective body parts. The region proposal network is an image processing software implementation that utilizes data from the feature maps to predict probable portions of images and layers of images that contain anatomical pixels corresponding to an insect body part.

The classification network 824 is a software tool implemented by a computer for generating classification output images 828, and in some embodiments, these classification output images include updated versions of original images with bounding polygons 812, 817 therein, labels 1125, 1135, 1145, 1155 for anatomical component names thereon, and even color coding as shown in Table 4 that may aid in genus and species identification. The example embodiments herein shows the system identifying insects such as a mosquito and anatomical component names including wings, legs, thorax, and abdomen corresponding to the respective body parts. In some non-limiting embodiments, the classification network utilizes a per-pixel sigmoid network. In non-limiting uses, the system populates a database storing tested outputs of the classification network, wherein the outputs include image versions with labels of anatomical component names thereon, and wherein the database stores respective genus and species information with corresponding data about respective genera and species.

The system embodiment may be implemented with at least one computer that performs a a computerized method of extracting information about anatomical components of a living creature from an image. The images may include digital images of insects or other animals or even inanimate objects, wherein the digital images include views of respective insects, animals, or inanimate objects from directly above the specimen and from side angles relative to a background holding the respective specimens. By training a mask-region based convolutional neural network with a set of training images, segmented with computerized algorithms, the method begins by identifying ground truth anatomical components to a set degree of accuracy. The training for the convolutional neural networks used in this disclosure generally includes classifying respective anatomical components in the training images and comparing the training images to the ground truth images. By tightening bounding boxes surrounding the anatomical components in the digital images, the method learns how to maximize efficiency and accuracy in ultimately generating a mask for use in extracting information of a second set of images, such as feature maps that have been previously created. For forming the ground truth images, the computerized algorithm may utilize an image annotator tool configured for manual operation. The training iteratively updates hyperparameters that target anatomical pixels in a training data set. This method has a proven track record of tracking, identifying, and archiving genera and species identifying data for a plurality of species of a plurality of genera of insects.

In example implementations, at least some portions of the activities may be implemented in software provisioned on a networking device. In some embodiments, one or more of these features may be implemented in computer hardware 1200, provided external to these elements, or consolidated in any appropriate manner to achieve the intended functionality. The various network elements may include software (or reciprocating software) that can coordinate image development across domains such as time, amplitude, depths, and various classification measures that detect movement across frames of image data and further detect particular objects in the field of view in order to achieve the operations as outlined herein. In still other embodiments, these elements may include any suitable algorithms, hardware, software, components, modules, interfaces, or objects that facilitate the operations thereof.

Furthermore, computer systems described and shown herein (and/or their associated structures) may also include suitable interfaces for receiving, transmitting, and/or otherwise communicating data or information in a network environment. Additionally, some of the processors 1202 and memory elements 1204 associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Figure 12:
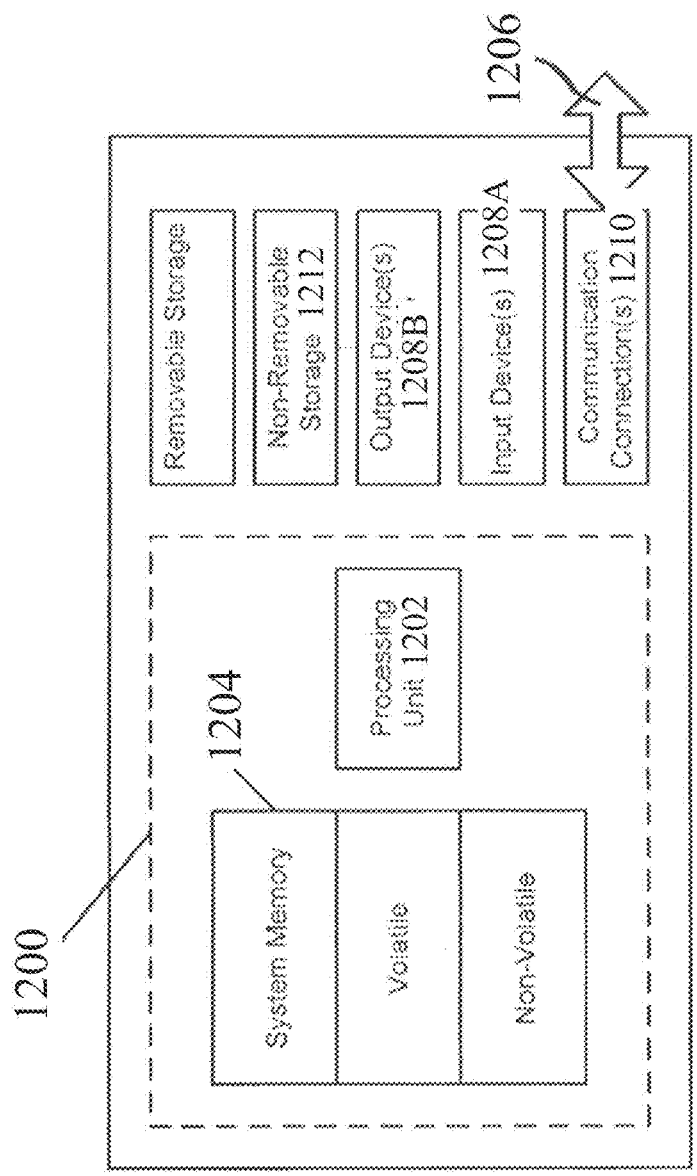
FIG. 12 is a schematic illustration of a computer environment in which neural networks according to this disclosure are processed for anatomy segmentation and pest identification according to embodiments of this disclosure.

These devices may further keep information in any suitable type of non-transitory storage medium 1212 (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' See FIG. 12 for a schematic example showing a computing environment for input devices 1208A, such as imaging devices described above, and output devices 1208B such as smartphones of FIGS. 6 and 7. This computer environment is amenable to various network and cloud connections as shown at Ref. 1206.

It must also be noted that, as used in the specification and the appended claims, the singular forms "a," "an" and "the" include plural referents unless the context clearly dictates otherwise. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Ranges may be expressed herein as from "about" or "approximately" one particular value to "about" or "approximately" another particular value. When such a range is expressed, exemplary embodiments include from the one particular value to the other particular value. As used herein, "about" or "approximately" generally can mean within 20 percent, preferably within 10 percent, and more preferably within 5 percent of a given value or range, and can also include the exact value or range. Numerical quantities given herein can be approximate, meaning the term "about" or "approximately" can be inferred if not expressly stated.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

REFERENCES

1. Minakshi, M., Bharti, P. & Chellappan, S. Leveraging smart-phone cameras and image processing techniques to classify mosquito species. In *Proceedings of the 15th EAI International Conference on Mobile and Ubiquitous Systems: Computing, Networking and Services*, 77-86 (ACM, 2018).
2. De Los Reyes, A. M. M., Reyes, A. C. A., Torres, J. L., Padilla, D. A. & Villaverde, J. Detection of *Aedes aegypti* mosquito by digital image processing techniques and support vector machine. In 2016 *IEEE Region 10 Conference (TENCON)*, 2342-2345 (IEEE, 2016).
3. Fuchida, M., Pathmakumar, T., Mohan, R. E., Tan, N. & Nakamura, A. Vision-based perception and classification of mosquitoes using support vector machine. *Appl. Sci.* 7, 51 (2017).
4. Favret, C. & Sieracki, J. M. Machine vision automated species identification scaled towards production levels. *Syst. Entomol.* 41, 133-143 (2016).
5. Minakshi, M. et al. Automating the surveillance of mosquito vectors from trapped specimens using computer vision techniques. In *ACM COMPASS* (ACM, 2020).
6. Park, J., Kim, D. I., Choi, B., Kang, W. & Kwon, H. W. Classification and morphological analysis of vector mosquitoes using deep convolutional neural networks. *Sci. Rep.* 10, 1-12 (2020).
7. Chen, Y., Why, A., Batista, G., Mafra-Neto, A. & Keogh, E. Flying insect detection and classification with inexpensive sensors. *J. Vis. Exp. (JOVE)* e52111 (2014).
8. Mukundarajan, H., Hol, F. J., Castillo, E. A., Newby, C. & Prakash, M. Using mobile phones as acoustic sensors for the surveillance of spatio-temporal mosquito ecology (2016).
9. Vasconcelos, D., Nunes, N., Ribeiro, M., Prandi, C. & Rogers, A. Locomobis: a low-cost acoustic-based sensing system to monitor and classify mosquitoes. In 2019 *16th IEEE Annual Consumer Communications & Networking Conference (CCNC)*, 1-6 (IEEE, 2019).
10. Ravi, P., Syam, U. & Kapre, N. Preventive detection of mosquito populations using embedded machine learning on low power iot platforms. In *Proceedings of the 7th Annual Symposium on Computing for Development*, 1-10 (2016).
11. He, K., Gkioxari, G., Dollar, P. & Girshick, R. Mask r-cnn. Proceedings of the IEEE International Conference on Computer Vision 2961-2969 (2017).
12. Lin, T.-Y. et al. Feature pyramid networks for object detection. In Proceedings of the IEEE Conference on Computer Vision and Pattern Recognition 2117-2125 (2017).
13. Smithsonian homepage. https://www.si.edu/. The importance of learning identification of larvae and adult mosquitoes. https://juniperpublishers.com/jojnhc/pdf/JOJNHC.MS. ID.555636.pdf.
14. Stauffer, C. & Grimson, W. E. L. Adaptive background mixture models for real-time tracking. In *Computer Vision and Pattern Recognition, 1999. IEEE Computer Society Conference on.*, vol. 2, 246-252 (IEEE, 1999).
15. Ronneberger, O., Fischer, P. & Brox, T. U-net: Convolutional networks for biomedical image segmentation. In *International Conference on Medical Image Computing and Computer-Assisted Intervention*, 234-241 (Springer, 2015).
16. Dai, J., He, K. & Sun, J. Instance-aware semantic segmentation via multi-task network cascades. In *Proceedings of the IEEE Conference on Computer Vision and Pattern Recognition* 3150-3158 (2016).
17. Li, Y., Qi, H., Dai, J., Ji, X. & Wei, Y. Fully convolutional instance-aware semantic segmentation. In *Proceedings of* the *IEEE Conference on Computer Vision and Pattern Recognition* 2359-2367 (2017).
18. Pinheiro, P. O., Collobert, R. & Dollar, P. Learning to segment object candidates. In *Advances in Neural Information Processing Systems* 1990-1998 (2015).
19. Girshick, R. Fast R-CNN. In Proceedings of the IEEE International Conference on Computer Vision 1440-1448 (2015).
20. Ren, S., He, K., Girshick, R. & Sun, J. Faster R-CNN: towards real-time object detection with region proposal networks. In *Advances in Neural Information Processing Systems* 91-99 (2015).
21. Dutta, A. & Zisserman, A. The VGG image annotator (via). arXiv preprint arXiv:1904.10699 (2019).
22. He, K., Zhang, X., Ren, S. & Sun, J. Deep residual learning for image recognition. In *Proceedings of the IEEE Conference on Computer Vision and Pattern Recognition,* 770-778 (2016).
23. Lin, T.-Y., Goyal, P., Girshick, R., He, K. & Dollar, P. Focal loss for dense object detection. In *Proceedings of the IEEE International Conference on Computer Vision,* 2980-2988 (2017).
24. Mask RCNN code. https://github.com/matterport/Mask_RCNN.
25. IFAS. Florida medical entomology laboratory. https://fmel.ifas.ufl.edu/mosquito-guide/species-identification-table/species-ident ification-table-adult/.
26. Glyshaw, P. & Wason, E. *Anopheles quadrimaculatus.* https://animaldiversity.org/accounts/Anopheles_quadrimaculatus/edu/mosquito-guide/species-identification-table/species-identification-table-adult/.
27. Dharmasiri, A. G. et al. First record of *Anopheles stephensi* in Sri Lanka: a potential challenge for prevention of malaria reintroduc-tion. *Malaria J.* 16, 326 (2017).
28. IFAS. Florida medical entomology laboratory. https://fmel.ifas.ufl.edu/publication/buzz-words/buzz-words-archive/is-it-*culex-tarsalis*-or-*culex*-coronator/
29. Floore, T. A., Harrison, B. A. & Eldridge, B. F. The *anopheles* (*anopheles*) *crucians* subgroup in the united states (diptera: Culicidae) (Tech. Rep, Walter Reed Army Inst Of Research Washington Dc Department Of Entomology, 1976)
30. Smithsonian Institution. https://collections.si.edu/search/results.htm?fq=tax_kingdom%3A%22animalia%22&fq=online_media_type%3A%22Images%22&fq=datasource%3A%22NMNH H+-+Entomology+Dept.%22&q=NMNH-USNMENT01001576&gfq=CSILP_6.
31. Smithsonian ttps://collections.si.edu/search/results.htm?fq=tax_kingdom%3A%22Animedia_type%3A%22Images%22&fq=data_source%3A%22NMNH+Entomology+Dept.%22&q=NMNH-ENT01006317&gfq=CSILP_6.
32. He, Kaiming, Georgia Gkioxari, Piotr Dollar, and Ross Girshick. "Mask r-cnn." In Proceedings of the IEEE international conference on computer vision, pp. 2961-2969. 2017.
33. He, Kaiming, Xiangyu Zhang, Shaoqing Ren, and Jian Sun. "Deep residual learning for image recognition." In Proceedings of the IEEE conference on computer vision and pattern recognition, pp. 770-778. 2016.
34. Lin, Tsung-Yi, Michael Maire, Serge Belongie, James Hays, Pietro Perona, Deva Ramanan, Piotr Dollár, and C. Lawrence Zitnick. "Microsoft coco: Common objects in context." In European conference on computer vision, pp. 740-755. Springer, Cham, 2014.
35. Stewart, Matthew Ph.D. Simple Introduction to Convolutional Neural Networks in *Towards Data Science* located at https://towardsdatascience.com/simple-introduction-to-convolutional-neural-networks-cdf8d3077bac.

The invention claimed is:

1. A system for identifying a genus and species of an insect, the system comprising:
   an imaging device configured to generate images of the insect;
   a computer processor connected to memory storing computer implemented commands in software, the memory receiving the images, wherein the software implements the following computerized method with respective images:
   applying a first convolutional neural network to the respective images to develop feature maps directed to anatomical pixels in the respective images that correspond to a body part of the insect;
   applying anchors to the feature maps, wherein the anchors identify portions of respective layers of image data in the feature maps that contain respective anatomical pixels for respective body parts;
   generating a mask that segments the respective anatomical pixels from the respective layers;
   extracting fully connected layers from the respective layers that have had the first convolutional neural network applied thereto;
   applying the fully connected layers to a regressor network and a classification network, wherein generating the mask for segmenting, applying the fully connected layers to a regressor network, and applying the fully connected layers to a classification network are parallel operations conducted by the software.

2. The system of claim 1, wherein the regressor network calculates error values regarding iterative positions for the anchors in the respective layers.

3. The system of claim 2, wherein the system uses the error values in a feedback loop to tighten the anchors around anatomical pixels corresponding to a respective body part.

4. The system of claim 3, wherein the anchors are bounding boxes originating from a region proposal network receiving the feature maps, and wherein the feedback loop transmits error values from the regressor network to the region proposal network to tighten the boxes on appropriate pixels corresponding to the respective body parts.

5. The system of claim 1, further comprising generating classification output images.

6. The system of claim 5, further comprising labeling the anchors with an anatomical component name.

7. The system of claim 6, wherein the insect is a mosquito and anatomical component names comprise wings, legs, thorax, and abdomen corresponding to the respective body parts.

8. The system of claim 1, further comprising weighting filters in the first convolutional neural network to identify, within the respective images, the anatomical pixels as foreground pixels and remaining pixels as background pixels to be removed during segmenting operations.

9. The system of claim 1, wherein the regressor network calculates error values regarding iterative positions for the anchors in the respective layers and wherein the error values are derived from a binary cross entropy loss function and/or a focal loss function.

10. The system of claim 1, wherein the classification network utilizes a per-pixel sigmoid network.

11. The system of claim 1, wherein the method implemented by the software further comprises an alignment function to align layers having anchors thereon with the original feature maps.

12. The system of claim 1, wherein generating the mask comprises applying a second convolutional neural network to the respective layers, wherein the second convolutional neural network segments the anatomical pixels according to a corresponding respective body part.

13. The system of claim 1, further comprising a database storing outputs of the classification network, wherein the outputs comprise labels of anatomical component names thereon, and wherein the database stores respective genus and species information with corresponding data about respective genera and species.

14. The system of claim 1, wherein the imaging device is a smart phone.

15. The system of claim 1, wherein generating the mask for segmenting, applying the fully connected layers to a regressor network, and applying the fully connected layers to a classification network are parallel operations conducted by the software simultaneously.

16. The system of claim 1, wherein the software further implements the following steps in the computerized method:
training a mask-region based convolutional neural network with a set of training images segmented with computerized algorithms that access ground truth anatomical data having a set degree of accuracy, wherein the training comprises:
classifying respective anatomical components in the training images and comparing the training images to ground truth images that include the ground truth anatomical data;
tightening bounding boxes surrounding corresponding anatomical components in the training images; and
generating a mask for use in extracting information from a second set of images.

17. The system of claim 16, wherein the computerized algorithm comprises an image annotator tool configured for manual operation.

18. The system of claim 16, wherein the training iteratively updates hyperparameters that target anatomical pixels in a training data set.

19. The system of claim 16, wherein the training images, the ground truth images, and the second set of images comprise digital images of a plurality of species of a plurality of genera of insects.

20. The system of claim 16, wherein the digital images comprise views of respective insects from directly above the insect and from side angles relative to a background holding the respective insects.

* * * * *